United States Patent
Shimonishi

(10) Patent No.: US 7,310,346 B2
(45) Date of Patent: Dec. 18, 2007

(54) NODE APPARATUS AND PACKET TRANSMISSION CONTROL METHOD

(75) Inventor: Hideyuki Shimonishi, Tokyo (JP)

(73) Assignee: NEC Corporation, Tokyo (JP)

(*) Notice: Subject to any disclaimer, the term of this patent is extended or adjusted under 35 U.S.C. 154(b) by 1046 days.

(21) Appl. No.: 10/330,500

(22) Filed: Dec. 30, 2002

(65) Prior Publication Data

US 2003/0133466 A1    Jul. 17, 2003

(30) Foreign Application Priority Data

Jan. 7, 2002    (JP)    ............ 2002-000479

(51) Int. Cl.
*H04L 12/56*    (2006.01)
*G06F 3/00*    (2006.01)

(52) U.S. Cl. ............ 370/412; 370/235; 370/394; 710/52

(58) Field of Classification Search ............ 710/52–57; 370/412–419, 394, 235–238.1; 709/232, 709/242
See application file for complete search history.

(56) References Cited

U.S. PATENT DOCUMENTS

| | | | |
|---|---|---|---|
| 6,138,172 A | | 10/2000 | Shimonishi |
| 6,704,321 B1 * | | 3/2004 | Kamiya ............ 370/412 |
| 7,058,751 B2 * | | 6/2006 | Kawarai et al. ............ 710/317 |
| 2002/0118695 A1 * | | 8/2002 | De Cnodder et al. ....... 370/428 |

FOREIGN PATENT DOCUMENTS

| | | | |
|---|---|---|---|
| EP | 859492 A2 * | 8/1998 | |
| EP | 1130877 A2 * | 9/2001 | |
| JP | 11-4131 | 1/1999 | |
| JP | 11-41316 | 2/1999 | |
| JP | 11-041316 | 12/1999 | |
| JP | 2000-183959 | 6/2000 | |
| JP | 2001-053798 | 2/2001 | |

OTHER PUBLICATIONS

M. Katavenis et al., "Weighted Round-Robin Cell Multiplexing in a General-Purpose ATM Switch Chip", *IEEE Journal on Selected Areas in Communications*, 1991, vol. 9, No. 8, pp. 1265-1279.

(Continued)

*Primary Examiner*—Chi Pham
*Assistant Examiner*—Tri H. Phan
(74) *Attorney, Agent, or Firm*—Foley & Lardner LLP

(57) ABSTRACT

A node apparatus includes ready queue lists, state variable storing section, state variable temporary storing section, and output control section. In the ready queue lists, the numbers of queues in a ready state for packet transmission are written. Each list manages the order in which the numbers were written. The state variable storing section holds state variables associated with all queues. The state variable temporary storing section temporarily stores only state variables associated with queues whose numbers fall within a predetermined range from the start of the list means and is smaller in data amount than the state variable storing section. The output control section transmits a packet from a queue having a number extracted from the start of the list and updates the state variable of the queue in the state variable temporary storing section. A method of transmitting packets is also disclosed.

32 Claims, 14 Drawing Sheets

OTHER PUBLICATIONS

M. Shreedhar et al., "Efficient Fair Queuing Using Deficit Round Robin", *IEEE/ACM Transactions on Networking*, Jun. 1996, vol. 4, No. 3, pp. 375-385.

A. K. Parekh et al., "A Generalized Processor Sharing Approach to Flow Control in Integrated Services Networks: The Single-Node Case", Jun. 1993, *IEEE/ACM Transactions on Networking*, vol. 1, No. 3, pp. 344-357.

* cited by examiner

NODE APPARATUS AND PACKET TRANSMISSION CONTROL METHOD

BACKGROUND OF THE INVENTION

The present invention relates to a node apparatus such as a router or switch which stores a received packet or cell in a given queue on the basis of the attributes of the packet or cell and controls the transmission of packets on the basis of transmission conditions set for the respective queues and a packet transmission control method and, more particularly, to a node apparatus which transmits packets from a large number of queues at high speed and a packet transmission control method.

Packet communication is performed by using variable-length packets, whereas ATM communication is performed by using fixed-length cells. These packets and cells are given attributes by means of information contained in them. A router and a switch process packets and cells in accordance with their attributes.

For the sake of simplicity, in this specification, a node apparatus such as a router or switch will be simply referred to as a node apparatus, and a packet or cell will be simply referred to as a packet hereinafter.

In general, a node apparatus has a plurality of queues corresponding to the attributes of packets, and transmission conditions are set for the respective queues. The node apparatus includes a packet transmission controller, stores a received packet in a given queue in accordance with the attributes of the packet, and transmits packets in accordance with the transmission conditions set for the respective queues.

As a conventional packet transmission control method, a weighted round robin scheme (M. Katavenis et al., "Weighted round-robin cell multiplexing a general-purpose ATM switch chip", IEEE Journals on Selected Areas in Communication, Col. 9, No. 8, 1991; to be referred to as a WRR scheme hereinafter) is available. In the WRR scheme, a weight is set for each queue, and a packet is transmitted from each queue in accordance with the ratio of the set weights.

In the WRR scheme, a weight is set for each queue. A weight is allocated to each queue. The respective queues transmit packets while sharing a line band in accordance with the weights. A WRR node apparatus has a counter for each queue. Each counter records the number of packets that can be transmitted from a corresponding queue. The initial value of each counter is the value of a corresponding weight. A circulation sequence is set for each queue.

In this scheme, in accordance with the circulation sequence, the node apparatus searches for a queue in which one or more packets are stored and the counter value is 1 or more. Upon finding a queue in which one or more packets are stored and the counter value is 1 or more, the node apparatus transmits one packet from the queue and decrements the counter by one. The node apparatus begins to search for a queue in which one or more packets are stored and the counter value is 1 or more, from the queue next to the queue from which the packet has been transmitted, in accordance with the circulation sequence.

If there is no queue in which one or more packets are stored and the counter value is 1 or more, i.e., there is no queue that can transmit a packet, even after making one round of the queues, the node apparatus returns the counters of all the queues to the initial values, i.e., the values of the weights, and then starts processing again. Operation of returning the counters to the initial values will be referred to as reset operation hereinafter.

In the WRR scheme, therefore, when only one queue can transmit a packet, and a packet is transmitted from it, the node apparatus checks all the queues to see if packets can be transmitted. The node apparatus needs to check all the queues at the maximum to transmit one packet. The processing amount is proportional to the number of queues. As the number of queues increases, therefore, the packet processing speed of the node apparatus cannot be increased.

Japanese Patent Laid-Open No. 2001-053798 discloses the first conventional method of speeding up packet processing in the WRR scheme. According to the method disclosed in Japanese Patent Laid-Open No. 2001-053798, a content addressable memory (CAM) is mounted in a node apparatus and used to select a queue that can transmit a packet. The state of each queue is recorded on the content addressable memory to allow a quick search for a queue that matches a search word. The node apparatus finds a queue that can transmit a packet next by searching the content addressable memory with a search word indicating a state wherein a packet can be transmitted.

A node apparatus based on this method can always make a quick search for a queue that can transmit a packet in a predetermined period of time regardless of the number of queues, and hence is effective for high-speed processing in a case wherein there are many queues.

Japanese Patent Laid-Open No. 11-041316 discloses the second conventional method of speeding up packet processing in the WRR scheme. According to the method disclosed in Japanese Patent Laid-Open No. 11-041316, a node apparatus manages first and second lists. The first list manages queues that can transmit packets, i.e., the numbers of queues in each of which the counter value is 1 or more and one or more packets are stored. The second list manages the number of queues each of which stores one or more packets but cannot transmit it because the counter value is 0.

The node apparatus extracts the queue number at the start of the first list and transmits a packet from the queue having the number. If the queue is still in a ready state after having transmitted the packet, the node apparatus adds the number of this queue to the end of the first list. When a packet is left and the counter value is 0 in the queue which has transmitted the packet, the node apparatus adds the queue to the second list. When the counter becomes 0 in the queue which has transmitted the packet, the node apparatus does not add the queue to any list.

When there is no queue that can transmit a packet, i.e., the first list becomes empty, the node apparatus performs reset operation with respect to the counters of all the queues. The node apparatus then adds all the queue numbers in the second list to the first list, and starts packet processing again.

As the third conventional method, a deficit round robin scheme which is another conventional packet transmission control method (M. Shreedhar and G. Varghese, "Efficient Fair Queuing using Deficit Round Robin", IEEE/ACM Transactions on Networking, to be referred to as a DRR scheme hereinafter) is available. The DRR scheme is the same as the WRR scheme in that a node apparatus has weights and counters.

Unlike in the WRR scheme of cyclically transmitting packets one by one from the respective queues, in the DRR scheme, packets in one queue which can be transmitted are continuously transmitted. The DRR scheme differs from the WRR scheme in that the value of a counter value represents the data amount (e.g., byte) of packets that can be transmitted. In addition, weights and data amounts are defined as units. Furthermore, when reset operation is done for a counter, a weight is added to the counter.

For this reason, the node apparatus manages the first list described above. The node apparatus extracts a queue number from the start of the first list, and continuously transmits packets until no packet is left in the queue having the number or the counter value becomes smaller than the packet length of the first packet. Upon transmission of one packet, the node apparatus subtracts the packet length from the counter.

Upon transmission of all packets that can be transmitted from one queue, the node apparatus performs reset operation with respect to the counter of the queue. If one or more packets are stored in the queue, the node apparatus adds the queue to the end of the first list.

According to still another conventional packet transmission control method, unlike the WRR scheme and DRR scheme, no counter is used, and transmission times are used. As examples of this method, a weighted fair queuing scheme (A. K. Parekh and R. G. Gallager, "A Generalized processor sharing approach to flow control in integrated services networks—The single node case", IEEE INFOCOM92, Vo. 12, 1992; to be referred to as a WFQ scheme hereinafter) and various schemes originating from the WFQ scheme are available.

In the WFQ scheme, a node apparatus records a virtual finish time of transmission of the last packet transmitted from each queue, and sequentially transmits packets from a queue with the earliest finish time of transmission. In the WFQ scheme, therefore, when a packet is to be transmitted, the node apparatus needs to search for a queue, of all the queues, which has the earliest finish time of transmission. The calculation amount of processing for searching for a queue with the earliest finish time of transmission is generally proportional to the number of queues. As the number of queues increases, therefore, the packet processing speed of the node apparatus cannot be increased.

In the WFQ scheme, a conventional method in which packet processing is speeded up uses a calendar indicating a transmission schedule of packets. Note that this calendar is called a time wheel and the like. The calendar includes a plurality of entries. The respective entries are tables indicating the times and arranged in chronological order. On each entry, the number of a queue scheduled to transmit a packet at the corresponding time is recorded.

The node apparatus generates a calendar on the basis of the finish times of transmission, and uses the calendar when transmitting a packet. On an entry corresponding to the transmission time of each queue, the number of the queue is recorded. When a packet is to be transmitted, the node apparatus obtains a queue for transmitting the packet by reading the entries of the calendar in chronological order. With this operation, when a packet is to be transmitted, the node apparatus need not perform a large amount of processing proportional to the number of queues in finding a queue, of all the queues, which has the earliest finish time of transmission.

Various schemes similar to the WFQ scheme have been proposed. For example, the fourth conventional method is disclosed in Japanese Patent Laid-Open No. 2000-183959. According to the method disclosed in Japanese Patent Laid-Open No. 2000-183959, the node apparatus records, on each entry of a calendar, a queue which transmits a packet at the time corresponding to the entry. In this case, the node apparatus can record a plurality of queues on each entry in a list form.

In the first conventional scheme, the node apparatus needs to have a content addressable memory. Since the content addressable memory is much more expensive than a general memory, the cost of the node apparatus based on the first conventional scheme is very high. The node apparatus based on the first conventional scheme needs to have a general memory for counters in addition to a content addressable memory. This further increases the cost of the apparatus.

In the second conventional scheme, as shown in FIG. 14, the first or second list generally has a structure in which the respective data are concatenated by pointers. In this structure, each point must be read before the next pointer is read. For this reason, the node apparatus cannot shorten the transmission intervals of packets more than the read intervals of pointers. According to the second conventional scheme, any node apparatus applicable to an ultrafast line could not be made.

In the third conventional scheme, since a node apparatus manages queue numbers in a list, the apparatus cannot be applied to an ultrafast line as in the second conventional scheme.

In the node apparatus based on the second conventional scheme, when a list on which queue numbers are recorded is managed in the form of a table in which queue numbers are arranged in order as shown in FIG. 15, the next queue number can be read out before the preceding queue number is read out. This makes it possible to perform high-speed operation. However, tables equal in number to lists are required, and hence a large memory is required to manage a plurality of lists as in the node apparatus based on the second conventional scheme.

In the fourth conventional scheme, the node apparatus manages queue numbers in a list for each transmission time. For this reason, when queue numbers are managed by using a list having a general structure in which the respective data are concatenated by pointers, the packet transmission intervals cannot be shortened more than the time required to read out queue numbers from the memory. The node apparatus cannot therefore cope with an ultrafast line.

According to the second to fourth conventional schemes, the node apparatus extracts a queue number from a list, reads out a state variable associated with the extracted number, and then transmits a packet. Upon transmitting the packet, the node apparatus updates the state variable, and adds the queue number to a proper list in accordance with the result. Since it takes more time to read out data from the memory than it does to perform other processing. Therefore, reading out state variables from the memory has hindered an increase in processing speed of the node apparatus.

SUMMARY OF THE INVENTION

It is the first object of the present invention to provide a node apparatus and packet transmission control method which control the transmission of packets distributed to many queues at high speed.

It is the second object of the present invention to provide an inexpensive node apparatus and packet transmission control method which control the transmission of packets distributed to many queues at high speed.

It is the third object of the present invention to provide a node apparatus and packet transmission control method which can be applied to an ultrafast line by performing processing associated with the state variables of queues at high speed.

It is the fourth object of the present invention to provide a node apparatus and packet transmission control method which can be applied to an ultrafast line by reading out queue numbers at intervals shorter than the read time of pointers.

In order to achieve the above objects, according to the present invention, there is provided a node apparatus which stores a received packet in one of a plurality of queues, determines on the basis of a state variable of each of the queues whether each of the queues is in a ready state for packet transmission, and transmits the packet from the queue in a ready state for packet transmission, comprising list means in which numbers of queues in a ready state for packet transmission are written and which manages an order in which the numbers were written, state variable storing means for holding state variables associated with all queues, state variable temporary storing means which temporarily stores only state variables associated with queues whose numbers fall within a predetermined range from a start of the list means and is smaller in data amount than the state variable storing means, and control means for transmitting a packet from a queue having a number extracted from the start of the list means and updating a state variable of the queue in the state variable temporary storing means.

DESCRIPTION OF THE PREFERRED EMBODIMENTS

An embodiment of the present invention will be described in detail with reference to the accompanying drawings.

Figure 1:
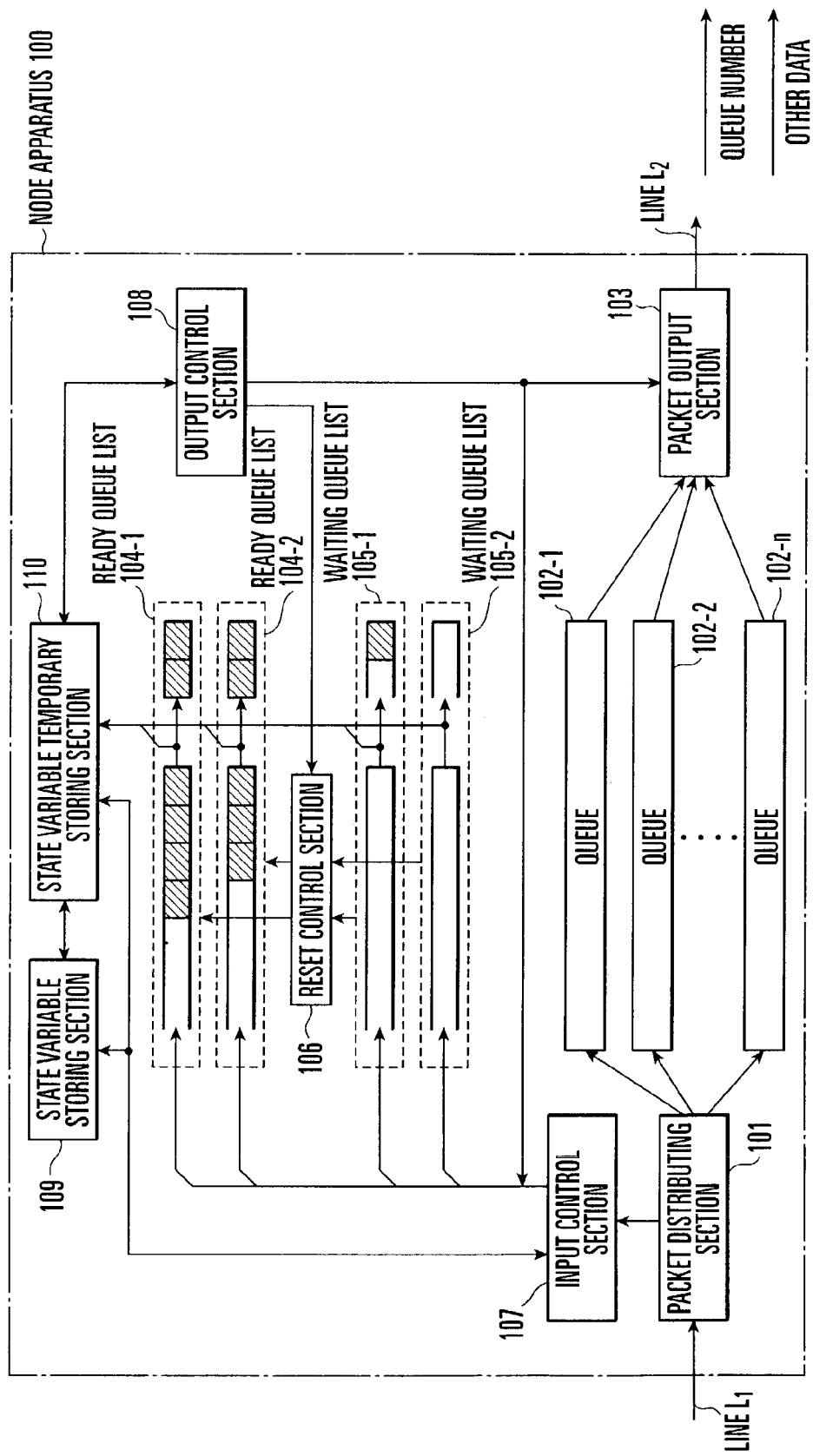
FIG. 1 is a block diagram showing the arrangement of a node apparatus according to an embodiment of the present invention.

FIG. 1 shows the arrangement of a node apparatus according to this embodiment.

Referring to FIG. 1, a node apparatus 100 includes a packet distributing section 101, queues 102-1 to 102-n, packet output section 103, ready queue lists 104-1 and 104-2, waiting queue lists 105-1 and 105-2, reset control section 106, input control section 107, output control section 108, state variable storing section 109, and state variable temporary storing section 110.

The packet distributing section 101 receives a packet from a line L1 and checks the attributes of the packet to select a queue in which the packet should be stored. A router as an example of the node apparatus determines a queue from the attributes of a received packet, e.g., the source IP address, destination IP address, fourth layer protocol number, source port number, destination port number, and TOS (Type Of Service) information. An Etherswitch as another example of the node apparatus determines a queue from the attributes of a received packet, e.g., the source MAC address, destination MAC address, IEEE802.1p priority level, and VLAN-ID.

The queues 102-1 to 102-n temporarily store packets distributed by the packet distributing section 101 according to their attributes. In this case, "n" represents the number of queues. This embodiment is effective when the number n of queues is large.

The packet output section 103 extracts one packet from the start of the queue designated by the output control section 108 and transmits it to a line L2.

The ready queue lists 104-1 and 104-2 hold the numbers of queues that can transmit packets. A queue that can transmit a packet is a queue in which the counter value is 1 or more and one or more packets are stored. Basically, the numbers of queues that can transmit packets are alternately written in the ready queue lists 104-1 and 104-2, and are alternately extracted therefrom.

The waiting queue lists 105-1 and 105-2 hold the numbers of queues in a wait state for packet, transmission. A wait state for packet transmission is a state wherein one or more packets are stored but the counter value is 0 or less. Basically, the numbers of queues in a wait state are alternately written in the waiting queue lists 105-1 and 105-2.

Upon reception of an instruction from the output control section 108, the reset control section 106 performs reset operation by transferring the contents of the waiting queue list 105-1 to the ready queue list 104-1 and transferring the contents of the waiting queue list 105-2 to the ready queue list 104-2.

The input control section 107 reads out the state variable of a queue in which a received packet should be stored from the state variable storing section 109 or state variable temporary storing section 110. The input control section 107 then adds the queue number to any one of the ready queue lists 104-1 and 104-2 and waiting queue lists 105-1 and 105-2 in accordance with the state variables.

To control the transmission of packets from the respective queues, first of all, the output control section 108 reads out a queue number from the start of the ready queue list 104-1 or 104-2, and reads out a state variable associated with the queue having the number from the state variable temporary storing section 110. At this time, the output control section 108 alternately reads out queue numbers from the ready queue lists 104-1 and 104-2. The output control section 108 then gives the packet output section 103 an instruction to transmit a packet from the corresponding queue. The output control section 108 also updates the state variable and adds the queue number based on the updated state variable to the list. In addition, when both the ready queue lists 104-1 and 104-2 become empty upon giving the packet output section 203 the instruction to transmit a packet, the output control section 108 instructs the reset control section 106 to perform reset operation.

The state variable storing section 109 holds state variables associated with the respective queues. State variables are information such as a weight, counter value, reset state, or queue length. A weight is assigned to each queue. Each queue transmits a packet by dividing the line bandwidth in accordance with weights. A counter is provided for each queue and manages the data amount of packets that can be transmitted from the queue. A reset state indicates whether the reset control section 106 has actually reset a counter upon reception of a reset instruction. If the reset control section 106 has not reset the counter upon reception of the reset instruction, the counter of the queue is in a non-reset state. If the counter has been reset, the counter is in a reset-complete state.

The state variable temporary storing section 110 temporarily holds state variables, of the state variables stored in the state variable storing section 109, which are associated with m or less queues from the starts of the ready queue lists 104-1 and 104-2 and waiting queue lists 105-1 and 105-2. The state variables held in the state variable temporary storing section 110 are partially prefetched information to perform transmission processing of packets at high speed.

Figure 2:
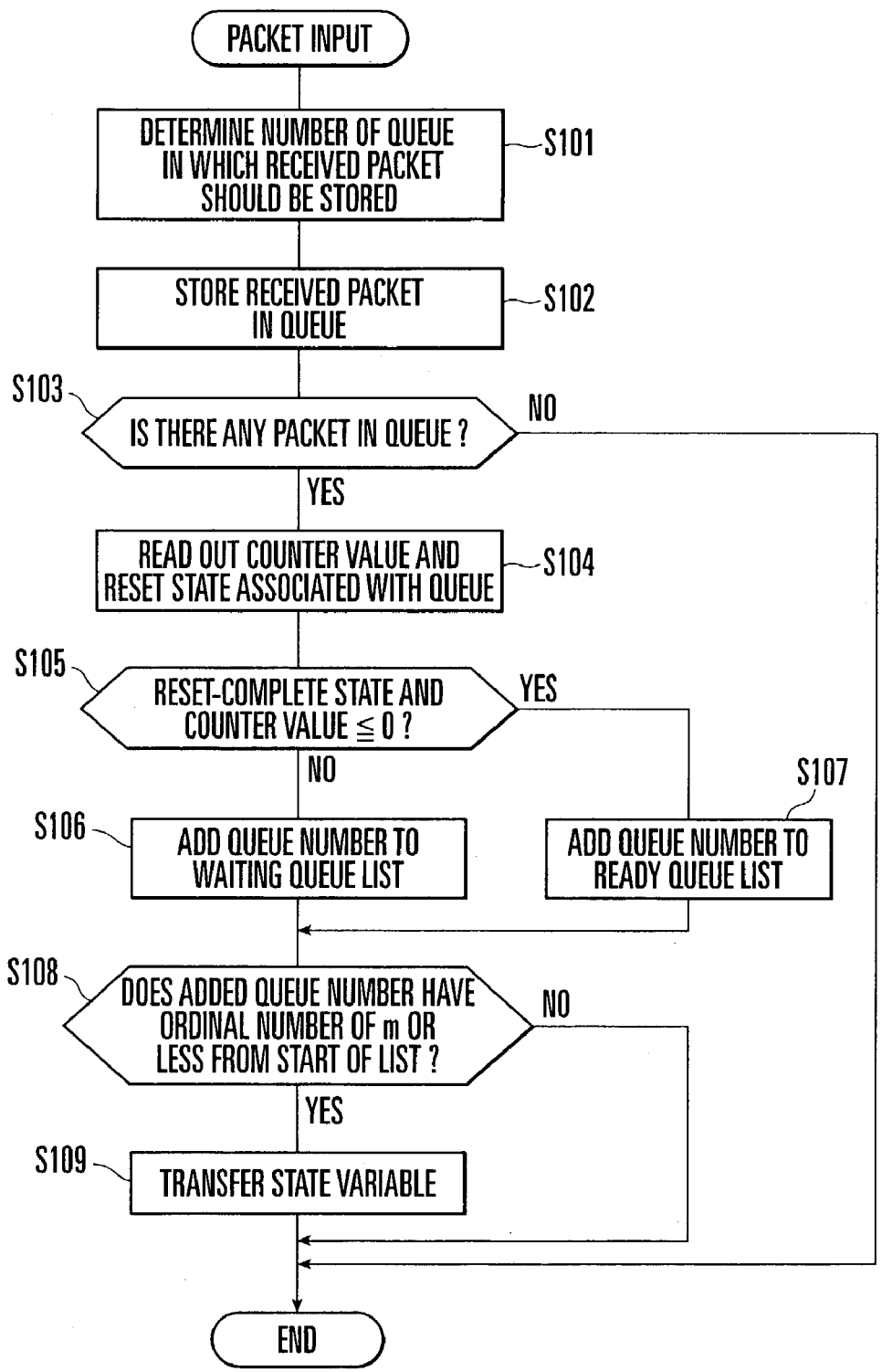
FIG. 2 is a flow chart showing packet receiving operation in the node apparatus in FIG. 1.

FIG. 2 shows packet receiving operation in the node apparatus according to this embodiment.

Referring to FIG. 2, upon reception of a packet from the line L1 in FIG. 1 in step S101, the packet distributing section 101 determines a queue in which the packet should be stored. In step S102, the packet distributing section 101 stores the packet in any one of the queues in accordance with the determination.

In step S103, the input control section 107 checks whether another packet is stored in the queue in which the received packet is to be stored. If another packet is stored in the queue in which the received packet is to be stored, the node apparatus 100 terminates the packet receiving operation.

If no other packet is stored in the queue in which the received packet is stored, the input control section 107 reads out the counter value and reset state of the queue from the state variable storing section 109 or state variable temporary storing section 110.

In step S105, the input control section 107 checks whether the counter of the queue is in a reset-complete state and the counter value is 0 or less.

If the counter value of the queue is 1 or more or the queue is in a non-reset state, the input control section 107 adds the queue number to one of the ready queue lists 104-1 and 104-2 in step S107. Note that queue numbers are alternately added to the ready queue lists 104-1 and 104-2. Alternatively, a queue number may be added to one of the ready queue lists 104-1 and 104-2 on which a smaller number of queue numbers are recorded or may be added to one of the lists in/from which no queue number has been written/read out.

If the counter of the queue is in a reset-complete state and the counter value is 0 or less, the input control section 107 adds the queue number to one of the waiting queue lists 105-1 and 105-2 in step S106. Note that queue numbers are alternately added to the waiting queue lists 105-1 and 105-2. Alternatively, a queue number may be added to one of the waiting queue lists 105-1 and 105-2 on which a smaller number of queue numbers are recorded or may be added to one of the waiting queue lists 105-1 and 105-2 in/from which no queue number has been written/read out.

In step S108, the input control section 107 checks whether the added queue has an ordinal number of m or less from the start of the list.

If the added queue has an ordinal number of m or less from the start of the list, the input control section 107 transfers the state variable of the queue from the state variable storing section 109 to the state variable temporary storing section 110 in step S109. The node apparatus 100 then terminates the packet receiving operation.

If the added queue does not have an ordinal number of m or less from the start of the list, the node apparatus 100 immediately terminates the packet receiving operation.

Figure 3:
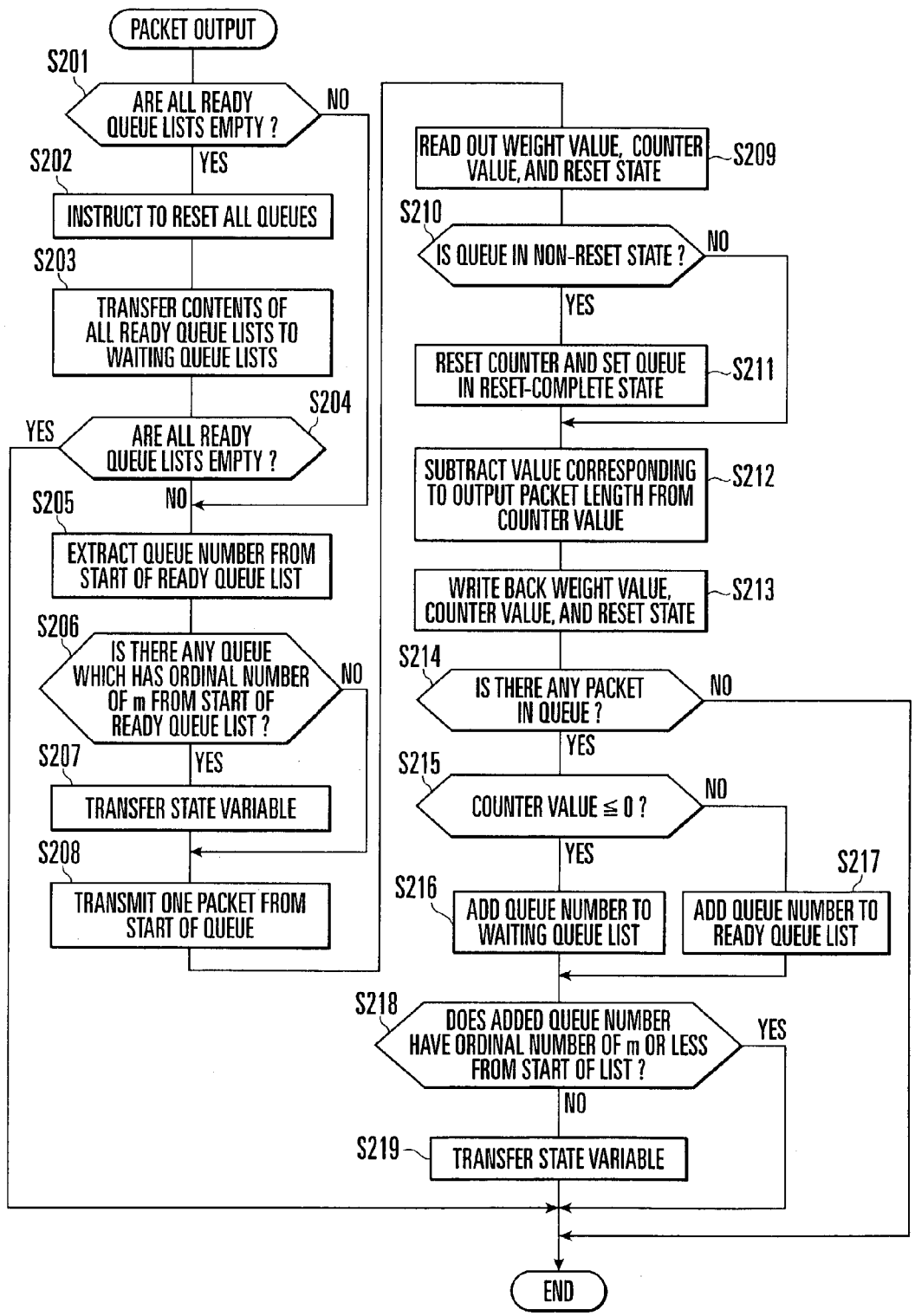
FIG. 3 is a flow chart showing packet transmitting operation in the node apparatus in FIG. 1.

FIG. 3 is a flow chart showing packet transmitting operation in the node apparatus according to this embodiment.

Referring to FIG. 3, first of all, the output control section 108 checks in step S201 whether both the ready queue lists 104-1 and 104-2 are empty.

If both the ready queue lists 104-1 and 104-2 are empty, the output control section 108 instructs the reset control section 106 to reset all the queues in step S202. In step S203, the reset control section 106 transfers the contents of the ready queue lists 104-1 and 104-2 to the waiting queue lists 105-1 and 105-2.

At this time, the output control section 108 may add weight values to all the counters and reset them. However, it takes a long period of time. In this embodiment, therefore, when a packet is transmitted from a given queue, the output control section 108 resets the counter of this queue. In this case, therefore, the reset control section 106 only performs reset operation upon reception of an instruction from the output control section 108. For this reason, the output control section 108 records a reset instruction time and reset processing time for each queue. The reset instruction time is the time when the output control section 108 gave the reset control section 106 the reset instruction. The reset processing time is the time when the counter of the queue was lastly reset. If, therefore, the reset processing time is earlier than the reset instruction time, the queue is in a non-reset state. If the reset instruction time is later than the reset processing time, the queue is in a reset-complete state.

In step S204, the output control section 108 checks whether both the ready queue lists 104-1 and 104-2 are empty. If both the ready queue lists 104-1 and 104-2 are empty, the node apparatus 100 terminates the packet transmitting operation.

If it is determined in step S201 or S204 that at least one of the ready queue lists 104-1 and 104-2 is not empty, the output control section 108 extracts a queue number from the start of one of the ready queue lists. Note that queue numbers are alternately extracted from the ready queue lists 104-1 and 104-2. Alternatively, a queue number may be extracted from one of the ready queue lists 104-1 and 104-2 on which a larger number of queue numbers are recorded.

In step S206, the output control section 108 checks whether there is a new queue which has an ordinal number of m from the start of the ready queue list after the processing in step S205.

If there is a new queue which has an ordinal number of m from the start of the ready queue list, the output control section 108 transfers the state variable of the queue from the state variable storing section 109 to the state variable temporary storing section 110.

If it is determined in step S206 that there is no queue which has an ordinal number of m from the start of the ready queue list, or after the processing in step S207, the output control section 108 instructs the packet output section 103 in step S208 to transmit a packet from the queue having the number extracted in step S205. The packet output section 103 transmits the first packet from the queue designated by the output control section 108.

In step S209, the output control section 108 reads out the weight, counter value, and reset state of the queue from the state variable temporary storing section 110.

In step S210, the output control section 108 checks whether the queue is in a non-reset state.

If the queue is in a non-reset state, the output control section 108 resets the counter to change the reset state into a reset-complete state in step S211. To change the reset state into a reset-complete state is to record a reset processing time. In resetting the counter, a weight value is added to the counter value. If, however, the counter value is larger than the weight value, the weight value is assigned to the counter value.

In step S212, the output control section 108 subtracts a value corresponding to the length of the packet transmitted in step S208 from the counter. In step S213, the output control section 108 returns the counter value, weight value, and reset state to the state variable temporary storing section 110. In step S214, the output control section 108 checks whether there is any packet left in the queue from the packet has been transmitted. If there is no packet left in the queue, the node apparatus 100 terminates the packet transmitting operation.

If there is any packet left in the queue, the output control section 108 checks in step S215 whether the counter value of the queue is 0 or less.

If the counter value is 0 or less, the output control section 108 adds the queue number to one of the waiting queue lists 105-1 and 105-2 in step S216. If the counter value is 1 or more, the output control section 108 adds the queue number to one of the ready queue lists 104-1 and 104-2 in step S217.

In step S218, the output control section 108 checks whether the added queue has an ordinal number of m or less from the start of the list. If the added queue has an ordinal number of m or less from the start of the list, the node apparatus 100 immediately terminates the packet transmitting operation. If the added queue does not have an ordinal number of m or less from the start of the list, the output control section 108 returns the state variable of the queue from the state variable temporary storing section 110 to the state variable storing section 109 in step S219.

In the node apparatus 100 of this embodiment, since a ready queue list and waiting queue list are each separated into two lists, even if data in each list are concatenated by pointers, queue numbers can be read out at intervals shorter than a pointer read time. This apparatus can therefore be applied to an ultrafast line.

The node apparatus 100 according to this embodiment can read out a queue number from a list formed by a general memory at high speed, and hence no content addressable memory is required. This apparatus can therefore be applied to an ultrafast line at a low cost.

In addition, according to the node apparatus 100 of this embodiment, a list having a structure in which the respective data are sequentially concatenated by pointers can be generated, and hence there is no need to perform management by using a list having a table structure in which queue numbers are arranged in a given order and to use any large-capacity memory. This apparatus can therefore be applied to an ultrafast line at a low cost.

Furthermore, the node apparatus 100 according to this embodiment prefetches the state variables of queues near the start of a list, and hence can perform packet transmission processing at high speed. This apparatus can therefore be applied to an ultrafast line.

Moreover, the node apparatus 100 according to this embodiment separately resets a counter for each queue when a packet is transmitted instead of resetting the respective queues at once, and hence the packet transmitting speed is not limited by the time required for reset operation. This apparatus can therefore be applied to an ultrafast line.

This embodiment has exemplified the case wherein a ready queue list and waiting queue list each include two lists. However, each list may include three or more lists. In this case, queue numbers may be cyclically stored and extracted as in the case wherein a ready queue list and waiting queue list each include two lists. Alternatively, a new queue number may be added to a list in which the smallest number of queue numbers have been stored, and a queue number may be extracted from a list in which the largest number of queues have been stored.

This embodiment has exemplified the case wherein a packet is transmitted from each queue in accordance with the weight. However, a predetermined band may be assigned to each queue in advance, and whether each queue is in a ready state or wait state may be determined on the basis of the band assigned to the queue. In this case, instead of a weight, data representing the band assigned to each queue may be used.

Another embodiment of the present invention will be described with reference to the accompanying drawings. A node apparatus according to this embodiment keeps transmitting packets from a given queue, once it starts transmitting a packet from the queue, until it can transmit no packet from the queue.

Figure 4:
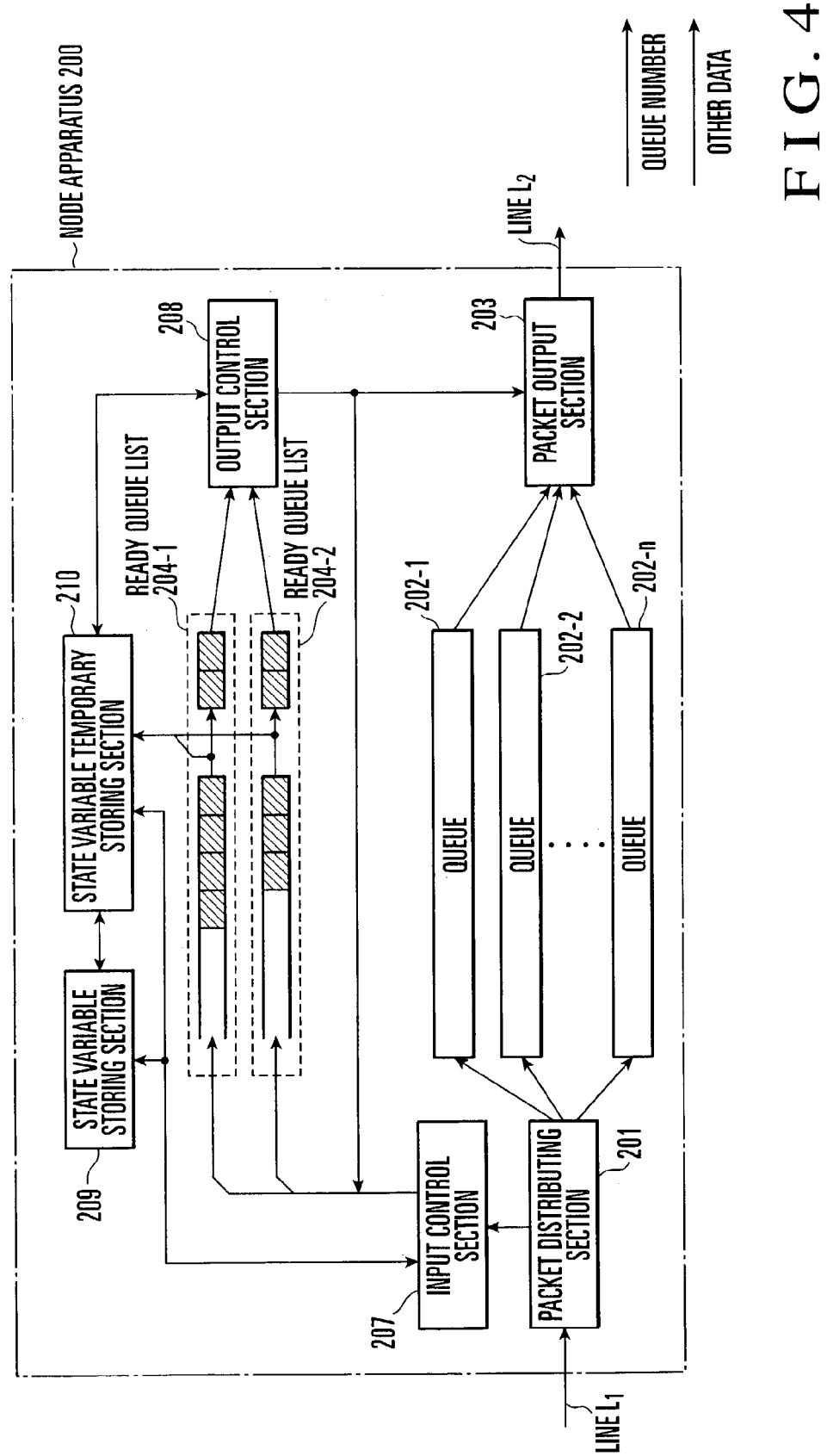
FIG. 4 is a block diagram showing the arrangement of a node apparatus according to another embodiment of the present invention.

FIG. 4 shows the arrangement of a node apparatus according to another embodiment of the present invention.

Referring to FIG. 4, a node apparatus 200 includes a packet distributing section 201, queues 202-1 to 202-n, packet output section 203, ready queue lists 204-1 and 204-2, input control section 207, output control section 208, state variable storing section 209, and state variable temporary storing section 210.

The arrangement and operation of the packet distributing section 201 are the same as those of the packet distributing section 101 in FIG. 1. The arrangement and operation of the queues 202-1 to 202-n are the same as those of the queues 102-1 to 102-n in FIG. 1. The arrangement and operation of the packet output section 203 are the same as those of the packet output section 103 in FIG. 1. The arrangement and operation of the ready queue lists 204-1 and 204-2 are the same as those of the ready queue lists 104-1 and 104-2 in FIG. 1. The arrangement and operation of the state variable storing section 209 are the same as those of the state variable storing section 109 in FIG. 1. The arrangement and operation of the state variable temporary storing section 210 are the same as those of the state variable temporary storing section 110 in FIG. 1.

The node apparatus 200 in FIG. 4 differs from the node apparatus 100 in FIG. 1 in the operations of the input control section 207 and output control section 208. In addition, the node apparatus 200 differs from the node apparatus 100 in FIG. 1 in that there are neither waiting queue list nor reset control section.

The input control section 207 reads out the state variable of a queue in which a packet received from a line L1 should be stored from the state variable storing section 209 or state variable temporary storing section 210. The input control section 207 then adds the queue number to one of the ready queue lists 204-1 and 204-2 in accordance with the state variable.

Unlike the node apparatus 100 in FIG. 1, the node apparatus 200 need not transfer any queue number from a waiting queue list to a ready queue list, and hence need not manage a reset state. The input control section 207 does not therefore discriminate the determination of a reset state and accompanying processing.

If there is a queue which is currently transmitting a packet, the output control section 208 transmits a packet from the queue. If there is no queue which is currently transmitting a packet, the output control section 208 extracts a queue number from the start of one of the ready queue lists 204-1 and 204-2, and transmits the packet from the queue having the number. If the queue which has transmitted the packet still contains any packets that can be transmitted, the output control section 208 lets the queue keep transmitting packets. If there is no packet that can be transmitted, the output control section 208 adds the queue number to a read queue list. In order to continuously transmit packets, the output control section 208 manages the busy state of the queue.

Figure 5:
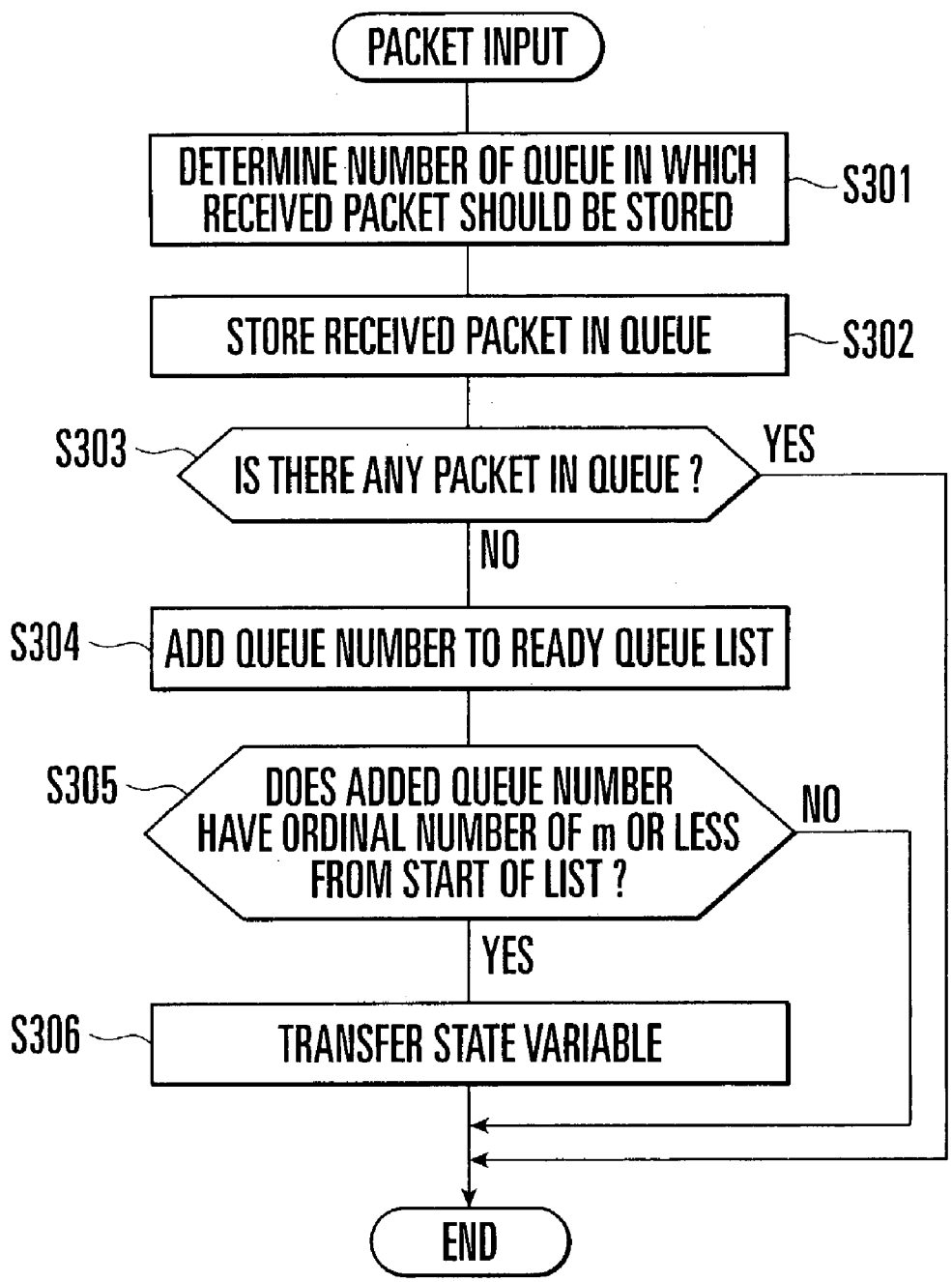
FIG. 5 is a flow chart showing packet receiving operation in the node apparatus in FIG. 4.

FIG. 5 shows packet receiving operation in the node apparatus shown in FIG. 4.

Referring to FIG. 5, in step S301, upon reception of a packet from the line L1, the packet distributing section 201 determines a queue in which the packet should be stored. In step S302, the packet distributing section 201 stores the packet in any one of the queues in accordance with the determination.

In step S303, the input control section 207 checks whether another packet is stored in the queue in which the received packet is to be stored. If another packet is stored in the queue in which the received packet is to be stored, the node apparatus 200 terminates the packet receiving operation.

If no other packet is stored in the queue in which the received packet is stored, the input control section 207 adds the queue number to one of the ready queue lists 204-1 and 204-2 in step S304.

In step S305, the input control section 207 checks whether the added queue has an ordinal number of m or less from the start of the list.

If the added queue has an ordinal number of m or less from the start of the list, the input control section 207 transfers the state variable of the queue from the state variable storing section 209 to the state variable temporary storing section 210 in step S306. The node apparatus 200 then terminates the packet receiving operation.

If the added queue does not have an ordinal number of m or less from the start of the list, the node apparatus 200 immediately terminates the packet receiving operation.

Figure 6:
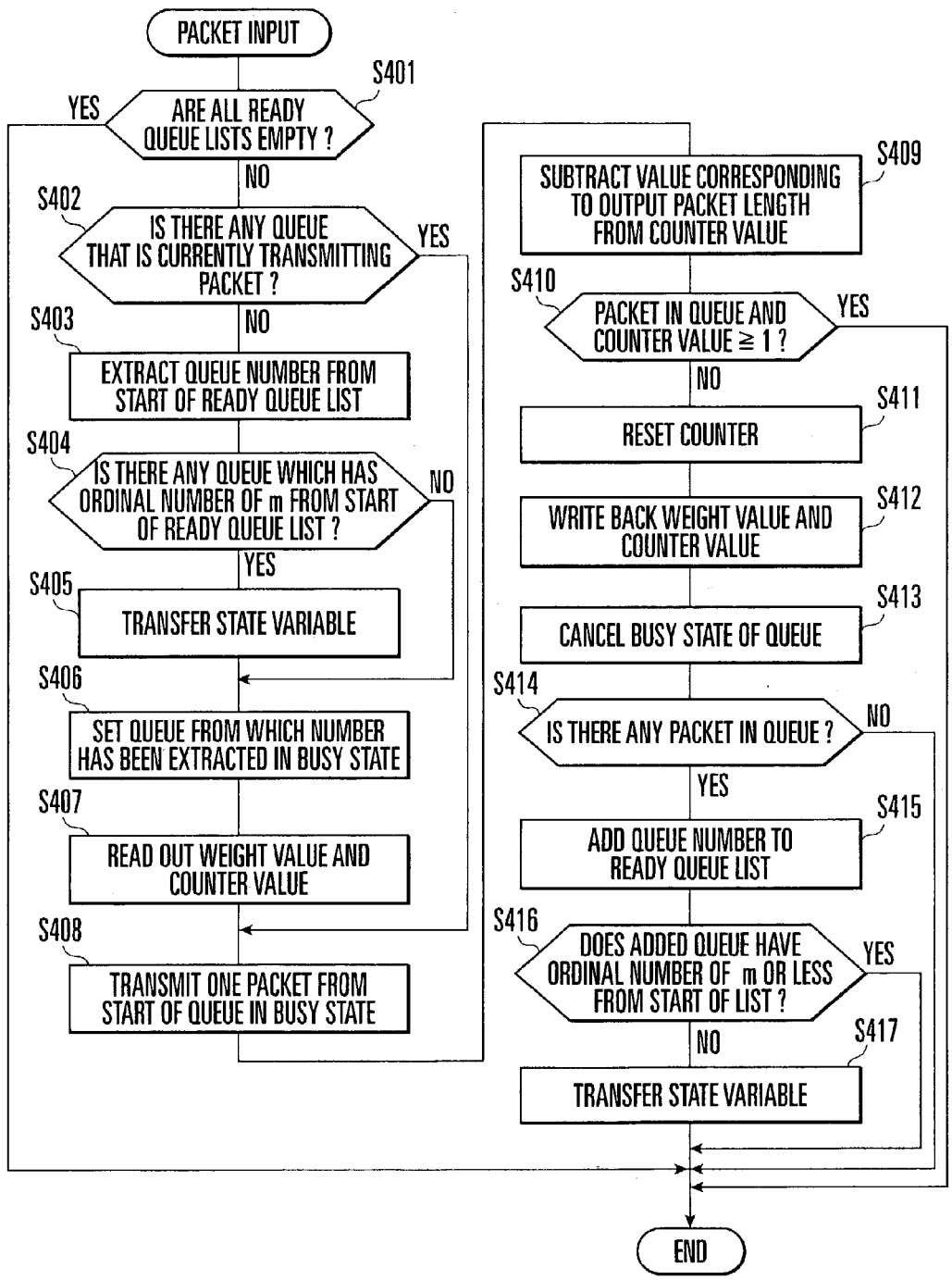
FIG. 6 is a flow chart showing packet transmitting operation in the node apparatus in FIG. 4.

FIG. 6 shows packet transmitting operation in the node apparatus shown in FIG. 4.

Referring to FIG. 6, first of all, the output control section 208 checks in step S401 whether both the ready queue lists 204-1 and 204-2 are empty.

If both the ready queue lists 204-1 and 204-2 are empty, the node apparatus 200 immediately terminates the packet transmitting operation.

If at least one of the ready queue lists 204-1 and 204-2 is not empty, the output control section 208 checks in step S402 whether there is a queue which is currently transmitting a packet.

If there is no queue which is currently transmitting a packet, a queue number is extracted from the start of one of the ready queue lists.

In step S404, the output control section 208 checks whether there is any new queue which has an ordinal number of m from the start of the ready queue list after the processing in step S403.

If there is any queue which has an ordinal number of m from the start of the ready queue list, the output control section 208 transfers the state variable of the queue from the state variable storing section 209 to the state variable temporary storing section 210 in step S405.

If it is determined in step S404 that there is no queue which has an ordinal number of m from the start of the ready queue list, or after the processing in step S405, the output control section 208 sets, in step S406, the queue having the number extracted in step S403 in a busy state.

In step S407, the output control section 208 reads out the weight and counter value of the queue from the state variable temporary storing section 210.

If it is determined in step S402 that there is a queue which is currently transmitting a packet, or after the processing in step S407, the output control section 208 instructs the packet output section 203 to transmit a packet from the queue in a busy state in step S408. The packet output section 203 then transmits a packet from the start of the queue designated by the output control section 208.

In step S409, the output control section 208 subtracts a value corresponding to the length of the packet transmitted in step S408 from the counter.

In step S410, the output control section 208 checks whether there is any packet left in the queue in a busy state, and the counter value is 1 or more. If a packet is left in the queue and the counter value is 1 or more, the node apparatus 200 immediately terminates the transmitting operation, and then starts the next transmitting operation.

If no packet is left in the queue or the counter value is 0 or less, the output control section 208 resets the counter in step S411.

In step S412, the output control section 208 returns the counter value and weight value to the state variable temporary storing section 210. The output control section 208 then cancels the busy state of the queue in step S413.

In step S414, the output control section 208 checks whether there is any packet left in the queue. If no packet is left in the queue, the node apparatus 200 terminates the transmitting operation, and starts the next transmitting operation.

If a packet is left in the queue, the output control section 208 adds the queue number to one of the ready queue lists 204-1 and 204-2 in step S415.

In step S416, the output control section 208 checks whether the added queue has an ordinal number of m or less from the start of the list. If the added queue has an ordinal number of m or less from the start of the list, the node apparatus 200 immediately terminates the transmitting operation, and starts the next transmitting operation.

If the added queue does not have an ordinal number of m or less from the start of the list, the output control section 208 returns the state variable of the queue from the state variable temporary storing section 210 to the state variable storing section 209 in step S417.

Still another embodiment of the present invention will be described with reference to the accompanying drawings. A node apparatus according to this embodiment manages the transmission schedule of packets by using a calendar. The calendar includes a plurality of lists arranged in chronological order. On each list, the numbers of queues scheduled to finish the transmission of packets at the corresponding times are recorded. When a band for packet transmission is assigned to each queue, even a ready queue cannot transmit packets at intervals shorter than predetermined time intervals. In this case, the queue is recorded on a list of the calendar such that packets are transmitted from the queue at the predetermined intervals. At the time indicated by the list, the queue number is extracted from the calendar, and a packet is transmitted from the queue.

Figure 7:
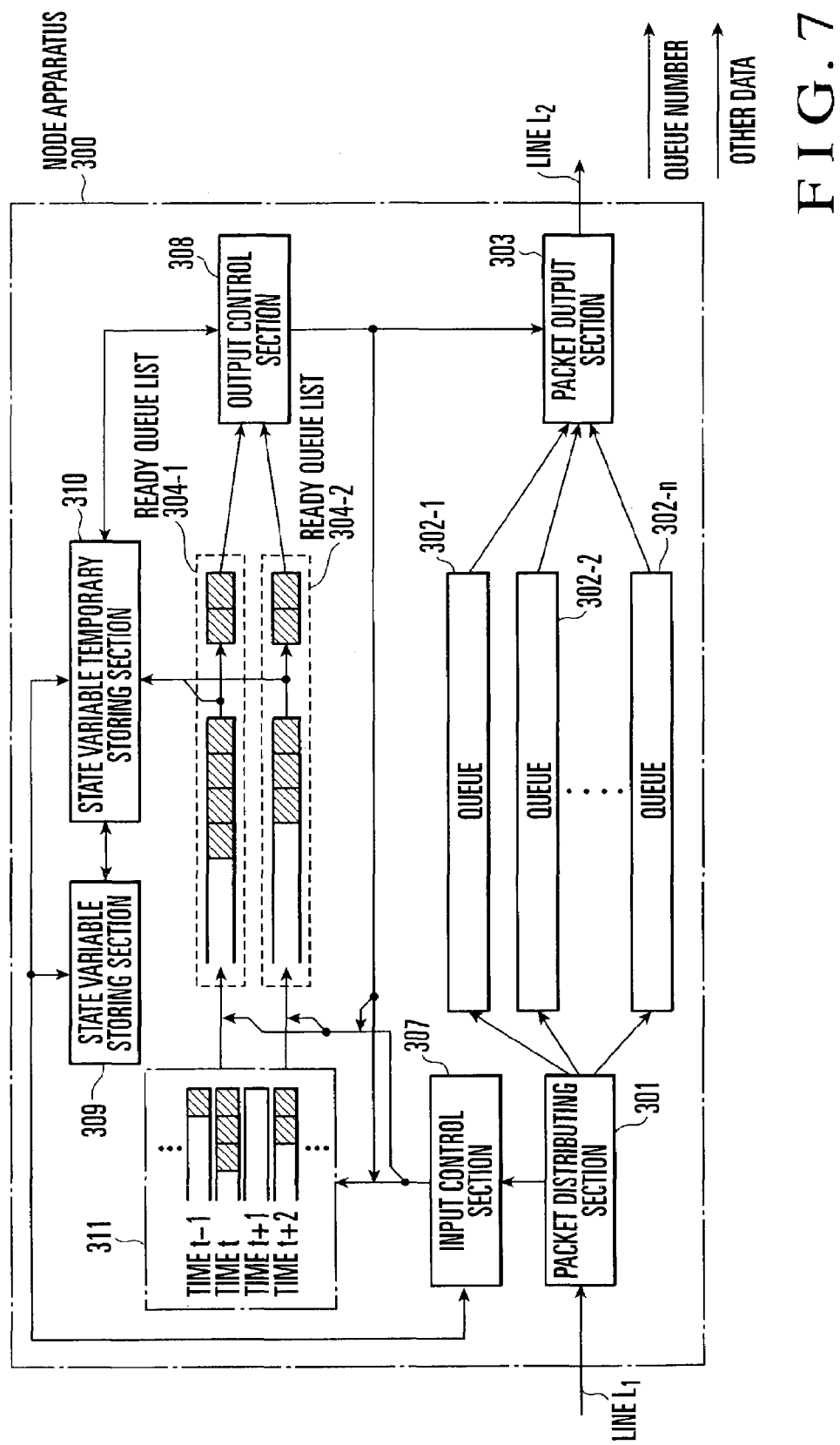
FIG. 7 is a block diagram showing the arrangement of a node apparatus according to still another embodiment of the present invention.

FIG. 7 shows the arrangement of a node apparatus according to this embodiment.

Referring to FIG. 7, a node apparatus 300 includes a packet distributing section 301, queues 302-1 to 302-n, packet output section 303, ready queue lists 304-1 and 304-2, input control section 307, output control section 308, state variable storing section 309, state variable temporary storing section 310, and calendar 311.

The arrangement and operation of the packet distributing section 301 are the same as those of the packet distributing section 101 in FIG. 1. The arrangement and operation of the queues 302-1 to 302-n are the same as those of the queues 201-1 to 202-n in FIG. 4. The arrangement and operation of the packet output section 303 are the same as those of the packet output section 103 in FIG. 1. The arrangement and operation of the ready queue lists 304-1 and 304-2 are the same as those of the ready queue lists 104-1 and 104-2 in FIG. 1. The arrangement and operation of the state variable storing section 309 are the same as those of the state variable storing section 109 in FIG. 1. The arrangement and operation of the state variable temporary storing section 310 are the same as those of the state variable temporary storing section 11 in FIG. 1. Note, however, that the node apparatus 300 manages the transmission schedule of packets by using the calendar 311, and hence state variables include the scheduled finish time of packet transmission from each queue. In addition, a band for packet transmission is assigned to each queue. The state variables also include this set band of each queue.

The node apparatus 300 in FIG. 7 differs from the node apparatus 100 in FIG. 1 in the operations of the input control section 307 and output control section 308. The node apparatus 300 also differs from the node apparatus 100 in FIG. 1 in that it has neither waiting queue list nor reset control section and has the calendar 311.

The input control section 307 reads out from the state variable storing section 309 or state variable temporary storing section 310 the state variable of a queue in which a packet received from a line L1 should be stored. The input control section 307 adds the queue number to any one of the ready queue lists 304-1 and 304-2 and calendar 311 in accordance with the state variable.

To control the transmission of packets from the respective queues, first of all, the output control section 308 reads out a queue number from the start of the ready queue list 304-1 or 304-2, and reads out a state variable associated with the queue having the number from the state variable temporary storing section 310. The output control section 308 then gives the packet output section 303 an instruction to transmit a packet from the corresponding queue. After instructing the packet output section 303 to transmit the packet, the output control section 308 adds the queue number to one of the ready queue lists 304-1 and 304-2 and calendar 311 in accordance with the state variable of the queue.

The calendar 311 holds lists for the respective times corresponding to the predetermined intervals in chronological order. On each list, the numbers of queues scheduled to finish the transmission of packets at the corresponding times are recorded.

Figure 8:
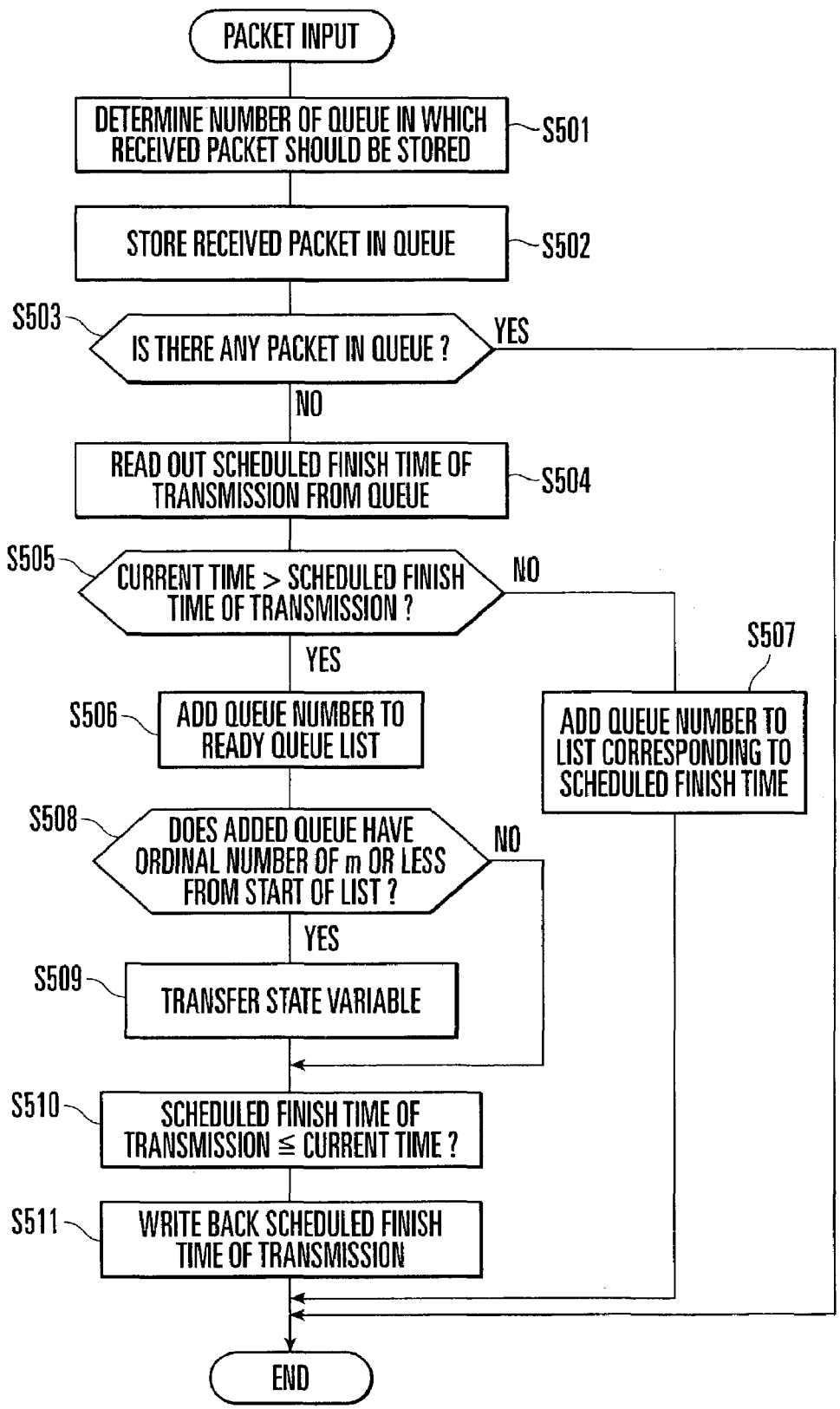
FIG. 8 is a flow chart showing packet receiving operation in the node apparatus in FIG. 7.

FIG. 8 shows packet receiving operation in the node apparatus 300 in FIG. 7.

Referring to FIG. 8, in step S501, upon reception of a packet from the line L1, the packet distributing section 301 determines a queue in which the packet should be stored. In step S502, the packet distributing section 301 stores the packet in any one of the queues in accordance with the determination.

In step S503, the input control section 307 checks whether another packet is stored in the queue in which the received packet is to be stored. if another packet is stored in the queue in which the received packet is to be stored, the node apparatus 300 terminates the packet receiving operation.

If no other packet is stored in the queue in which the received packet is stored, the input control section 307 reads out, from the state variable storing section 309 or state variable temporary storing section 310, the scheduled finish time of packet transmission from the queue.

In step S505, the input control section 307 checks whether the current time has reached the read scheduled finish time of transmission. If NO in step S505, the input control section 307 records the queue number in a list of the calendar 311 which corresponds to the scheduled finish time of transmission in step S507. The node apparatus 300 then terminates the packet receiving operation.

If YES in step S505, the input control section 307 adds the queue number to one of the ready queue lists 304-1 and 304-2 in step S506.

In step S508, the input control section 307 checks whether the added queue has an ordinal number of m or less from the start of the list.

If the added queue has an ordinal number of m or less from the start of the list, the input control section 307 transfers the state variable of the queue from the state variable storing section 309 to the state variable temporary storing section 310 in step S509.

If the added queue does not have an ordinal number of m or less from the start of the list, or after the processing in step S509, the input control section 307 assigns the current time to the scheduled finish time of transmission in step S510. In step S511, the input control section 307 writes back the scheduled finish time of transmission to the state variable storing section 309 or state variable temporary storing section 310.

Figure 9:
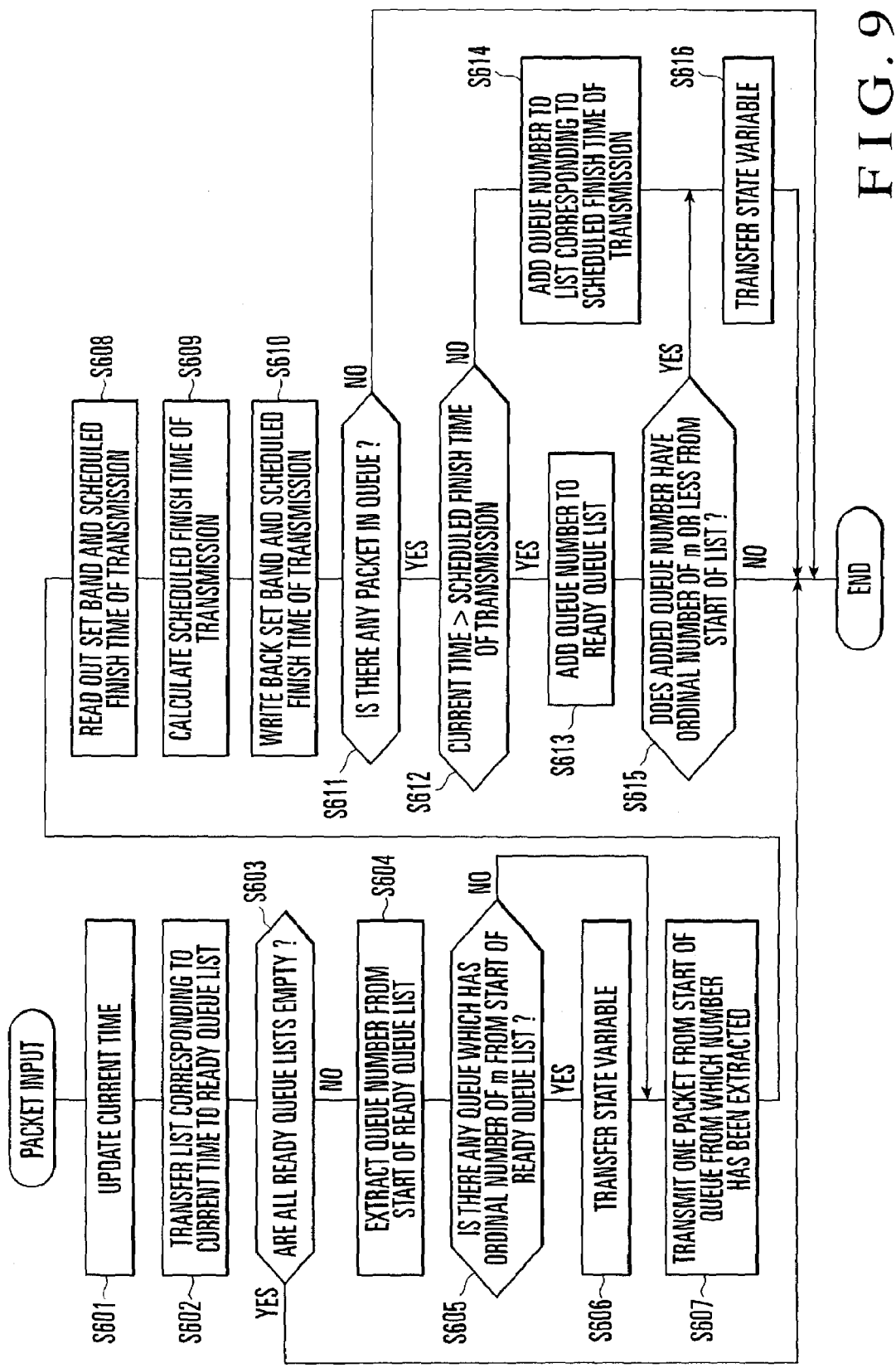
FIG. 9 is a flow chart showing packet transmitting operation in the node apparatus in FIG. 7.

FIG. 9 shows packet transmitting operation in the node apparatus 300 in FIG. 7.

Referring to FIG. 9, first of all, the node apparatus 300 updates the current time in step S601. In step S602, the output control section 308 transfers all the contents of a list of the calendar 311 which corresponds to the current time to one of the ready queue lists 304-1 and 304-2.

In step S603, the output control section 308 checks whether both the ready queue lists 304-1 and 304-2 are empty. If both the ready queue lists 304-1 and 304-2 are empty, the node apparatus 300 terminates the packet transmitting operation.

If at least one of the ready queue lists 304-1 and 304-2 is not empty, the output control section 308 extracts a queue number from the start of one of the ready queue lists in step S604.

In step S605, the output control section 308 checks whether there is any new queue that has an ordinal number of m or less from the start of the ready queue list after the processing in step S604.

If there is a queue that has an ordinal number of m from the start of the ready queue list, the output control section 308 transfers the state variable of the queue from the state variable storing section 109 to the state variable temporary storing section 110 in step S606.

If it is determined in step S605 that there is no queue that has an ordinal number of m from the start of the ready queue list, or after the processing in step S606, the output control section 308 gives the packet output section 303 an instruction to transmit a packet from the queue having the number extracted in step S604. The packet output section 303 transmits the first packet of the queue designated by the output control section 308.

In step S608, the output control section 308 reads out the set band and scheduled finish time of transmission of the queue from the state variable temporary storing section 310. In step S609, the output control section 308 calculates a scheduled finish time of transmission from the read set band and the data amount of the packet to be transmitted. In step S610, the output control section 308 writes back the set band and scheduled finish time of transmission to the state variable temporary storing section 310.

In step S611, the output control section 308 checks whether there is any packet left in the queue from which the packet has transmitted. If there is no packet left in the queue, the node apparatus 300 terminates the packet transmitting operation.

If a packet is left in the queue, the output control section 308 checks in step S612 whether the current time has reached the scheduled finish time of transmission. If the current time has not reached the scheduled finish time of transmission, the output control section 308 records in step S614 the queue number on a list of the calendar 311 which corresponds to the scheduled finish time of transmission.

In step S616, the output control section 308 transfers the state variable of the queue from the state variable storing section 309 to the state variable temporary storing section 310. The node apparatus 300 then terminates the packet transmitting operation.

If it is determined in step S612 that the current has reached the scheduled finish time of transmission, the output control section 308 adds the queue number to one of the ready queue lists 304-1 and 304-2 in step S613.

In step S615, the output control section 308 checks whether the added queue has an ordinal number of m or less from the start of the list. If the added queue has an ordinal number of m or less from the start of the list, the flow advances to step S616. If the added queue does not have an ordinal number of m or less from the start of the list, the node apparatus 300 immediately terminates the packet transmitting operation.

Still another embodiment of the present invention will be described with reference to the accompanying drawings.

Figure 10:
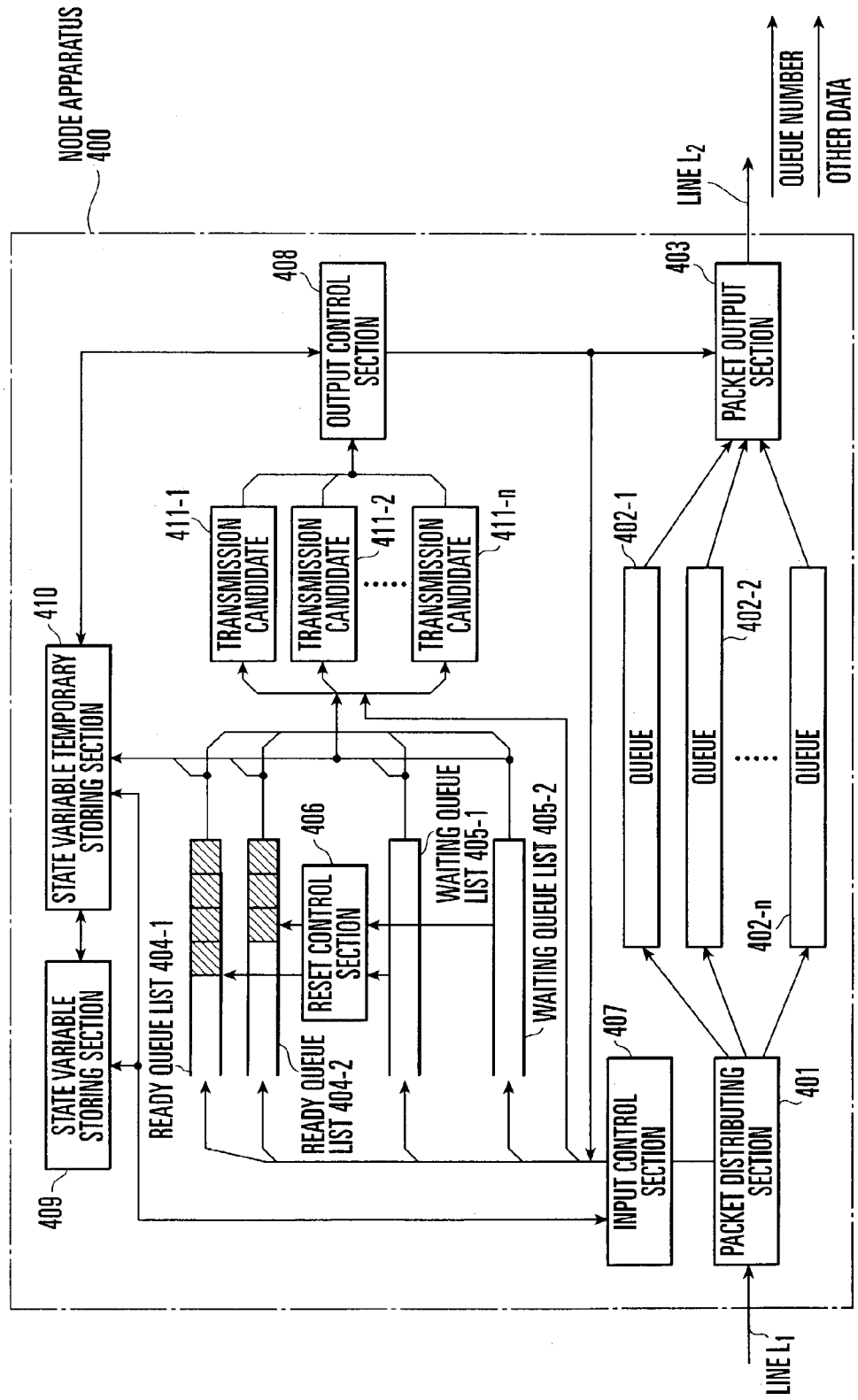
FIG. 10 is a block diagram showing the arrangement of a node apparatus according to still another embodiment of the present invention.

FIG. 10 shows the arrangement of a node apparatus according to this embodiment.

Referring to FIG. 10, a node apparatus 400 includes a packet distributing section 401, queues 402-1 to 402-n, packet output section 403, ready queue lists 404-1 and 404-2, waiting queue lists 405-1 and 405-2, reset control section 406, input control section 407, output control section 408, state variable storing section 409, state variable temporary storing section 410, and transmission candidates 411-1 to 411-$m$.

The arrangement and operation of the packet distributing section 401 are the same as those of the packet distributing section 101 in FIG. 1. The arrangement and operation of the queues 402-1 to 402-$n$ are the same as those of the queues 102-1 to 102-n in FIG. 1. The arrangement and operation of the packet output section 403 are the same as those of the packet output section 103 in FIG. 1.

In this embodiment, the transmission candidates 411-1 to 411-$m$ are provided in addition to the ready queue lists 404-1 and 404-2 and waiting queue lists 405-1 and 405-2. The transmission candidates 411-1 to 411-$m$ manage some queues as queues in preparation for transmission independently of the ready queue lists and waiting queue lists.

Each of the transmission candidates 411-1 to 411-$m$ stores the number of one queue whose state variables are stored in the state variable temporary storing section 410. A number m of transmission candidates is therefore equal to the number of state variables that can be stored in the state variable temporary storing section 410. Queues that transmit packets are cyclically selected from ready queues whose numbers are stored in the transmission candidates 411-1 to 411-$m$. When a packet is transmitted from any given transmission candidate and the candidate becomes empty, a queue whose number has been stored in one of the ready queue lists 404-1 and 404-2 is newly stored in a transmission candidate. Along with this operation, the state variable of the queue is transferred from the state variable storing section 409 to the state variable temporary storing section 410. The queues whose numbers are stored in the transmission candidates 411-1 to 411-$m$ are generally queues that can transmit packets. If, however, the number of queues that can transmit packets is smaller than the number m of transmission candidates, the number of a waiting queue is stored in a transmission candidate.

Therefore, the arrangements and operations of the ready queue lists 404-1 and 404-2 and waiting queue lists 405-1 and 405-2 are almost the same as those of the ready queue lists 104-1 and 104-2 and waiting queue lists 105-1 and 105-2 in FIG. 1 except that queue numbers are not directly sent to the output control section 408 but are temporarily stored in the transmission candidates 411-1 to 411-$m$.

The arrangements and operations of the state variable storing section 409 and state variable temporary storing section 410 are the same as those in FIG. 1 except that the state variables of the queues whose queue numbers are stored in the transmission candidates 411-1 to 411-$m$ are stored in the state variable temporary storing section 410.

The arrangement and operation of the input control section 407 are the same as those in FIG. 1. If there is an empty transmission candidate when a queue number is to be added to one of the ready queue lists 404-1 and 404-2 and waiting queue lists 405-1 and 405-2, the input control section 407 stores the queue number in the transmission candidate.

The output control section 408 instructs the packet output section 403 to cyclically transmit packets from ready queues of the queues whose numbers are stored in the transmission candidates 411-1 to 411-$m$. Upon instructing the packet output section 403 to transmit a packet from a given queue, the output control section 408 adds the number of the queue to one of the ready queue lists 404-1 and 404-2 and waiting queue lists 405-1 and 405-2 or leaves it in one of the transmission candidates 411-1 to 411-$m$ depending on the state or the like of the queue.

Figure 11:
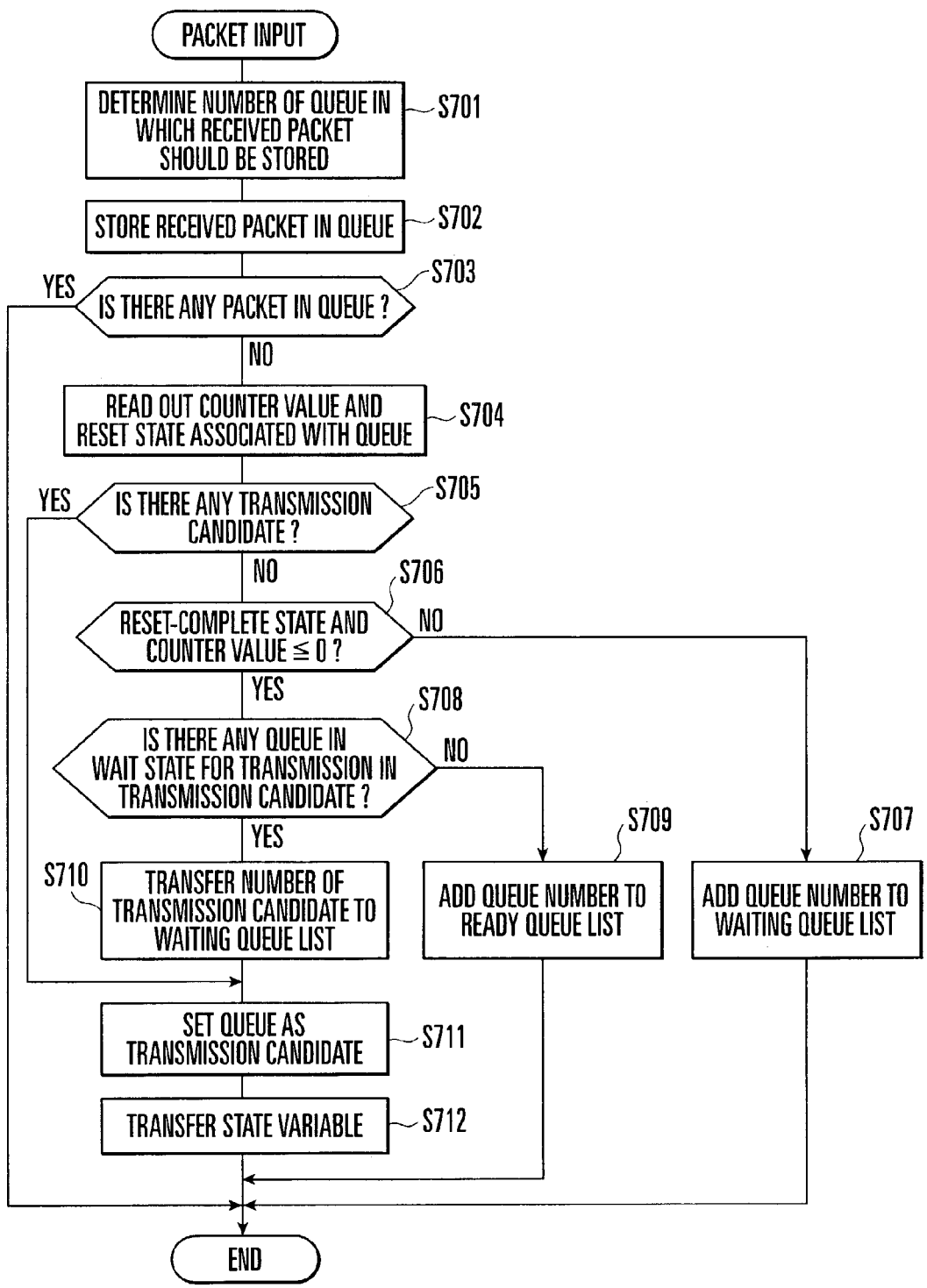
FIG. 11 is a flow chart showing packet receiving operation in the node apparatus in FIG. 10.

FIG. 11 shows packet receiving operation in the node apparatus 400 in FIG. 10.

Referring to FIG. 11, upon reception of a packet from the line L1 in step S701, the packet distributing section 401 determines a queue in which the packet should be stored. In step S702, the packet distributing section 401 stores the packet in one of the queues in accordance with the determination.

In step S703, the input control section 407 checks whether another packet is stored in the queue in which the received packet is to be stored. If another packet is stored in the queue in which the received packet is to be stored, the node apparatus 400 terminates the packet receiving operation.

If no other packet is stored in the queue in which the received packet is to be stored, the input control section 407 reads out in step S704 the counter value and reset state of the queue from the state variable storing section 409 or state variable temporary storing section 410.

In step S705, the input control section 407 checks whether at least one of the transmission candidates 411-1 to 411-$m$ is empty. If there is no empty candidate, the input control section 407 checks in step S706 whether the counter of the queue is in a reset-complete state and the counter value is 0 or less.

If the counter of the queue has been reset and the counter value is 0 or less, the input control section 407 adds the queue number to one of the waiting queue lists 405-1 and 405-2 in step S707. The node apparatus 400 then terminates the packet receiving operation.

If the counter value of the queue is 1 or more or the queue is in a non-reset state, the input control section 407 checks in step S708 whether there is a waiting queue in the transmission candidates 411-1 to 411-$m$.

If there is a waiting queue in the transmission candidates 411-1 to 411-$m$, the input control section 407 transfers the queue number stored in the corresponding transmission candidate to one of the waiting queue lists 405-1 and 405-2 in step S710.

If there is no waiting queue in the transmission candidates 411-1 to 411-$m$, the input control section 407 adds the attributes number to one of the ready queue lists 404-1 and 404-2 in step S709. The node apparatus 400 then terminates the packet receiving operation.

If it is determined in step S705 that there is an empty transmission candidate, or after the processing in step S710, the input control section 407 stores the queue number in the empty transmission candidate in step S711. In step S712, the input control section 407 transfers the state variable of the queue having the number from the state variable storing section 409 to the state variable temporary storing section 410. The node apparatus 400 then terminates the packet receiving operation.

Figure 12:
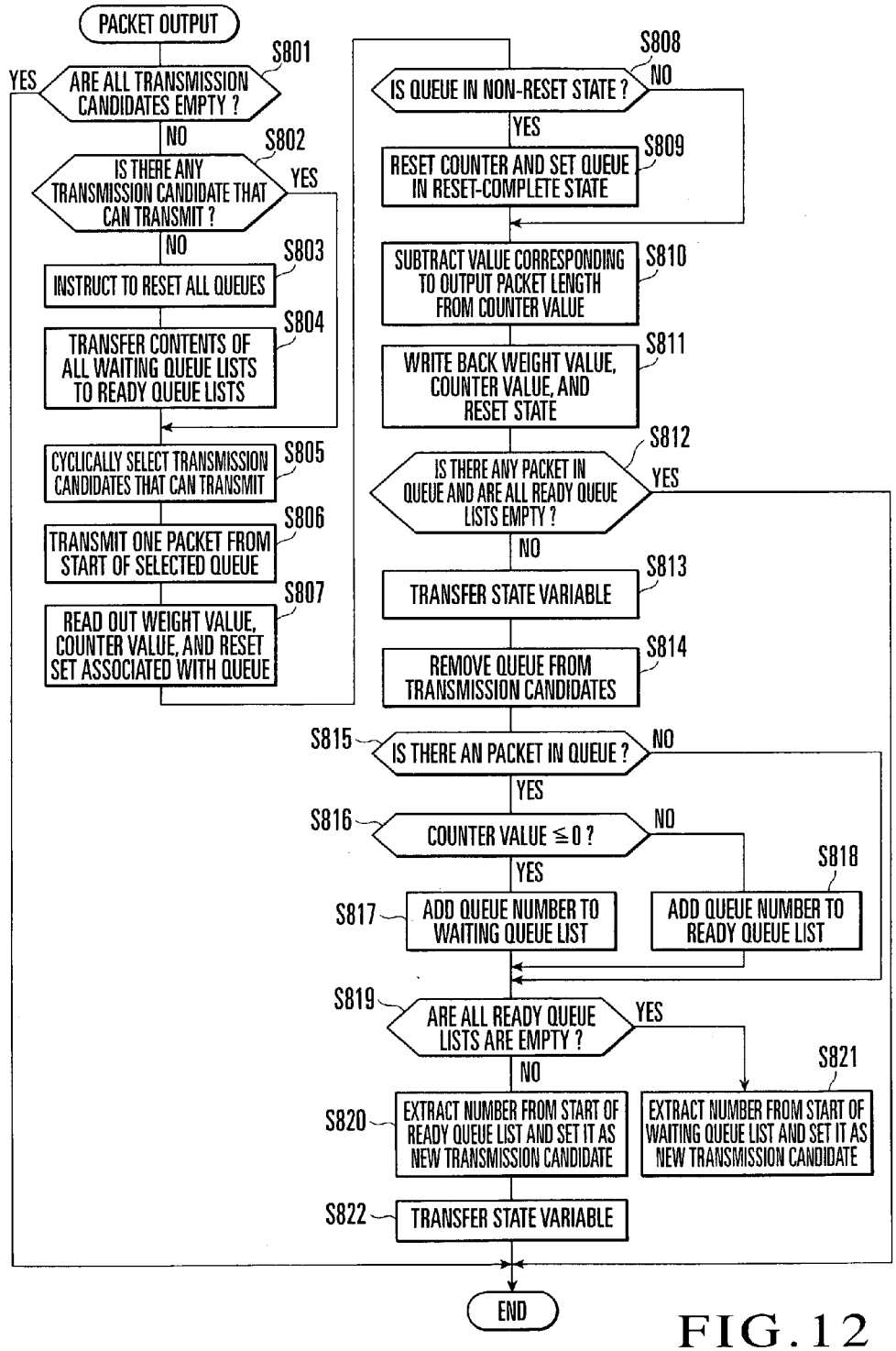
FIG. 12 is a flow chart showing packet transmitting operation in the node apparatus in FIG. 10.

FIG. 12 shows packet transmitting operation in the node apparatus 400 in FIG. 10.

Referring to FIG. 12, first of all, the output control section 408 checks in step S801 whether all the transmission candidates 411-1 to 411-$m$ are empty. If all the transmission candidates 411-1 to 411-$m$ are empty, the node apparatus 400 immediately terminates the packet transmitting operation.

If at least one of the transmission candidates 411-1 to 411-$m$ is not empty, the output control section 408 checks in step S802 whether there is a ready queue in the transmission candidates.

If there is no ready queue in the transmission candidates, the output control section 408 instructs the state variable storing section 409 to reset all the queues in step S803. In step S804, the reset control section 406 transfers the contents of all the waiting queue lists to the corresponding ready queue lists.

If it is determined in step S802 that there is a ready queue in a transmission candidate, or after the processing in step S804, the output control section 408 instructs the packet output section 403 to cyclically select and transmit packets from the ready queue in each transmission candidate in step S805. In step S806, the packet output section 403 transmits the first packet from the queue designated by the output control section 408.

In step S807, the output control section 408 reads out, from the state variable temporary storing section 410, the counter value and weight value of the queue for which the packet transmission instruction was given to the packet output section 403.

In step S808, the output control section 408 checks whether the queue is in a non-reset state.

If the queue is in a non-reset state, the reset control section 406 resets the counter in step S809 to set the reset state to a reset-complete state.

In step S810, the output control section 408 subtracts a value corresponding to the length of the packet transmitted in step S806 from the counter. In step S811, the output control section 408 returns the counter value, weight value, and reset state to the state variable temporary storing section 810.

In step S812, the output control section 408 checks whether there is any packet left in the queue and both the ready queue lists 404-1 and 404-2 are empty. If there is no packet left in the queue and both the ready queue lists 404-1 and 404-2 are empty, the node apparatus 400 terminates the packet transmitting operation.

If there is no packet left in the queue or at least one of the ready queue lists 404-1 and 404-2 is not empty, the output control section 408 returns the state variable of the queue from the state variable temporary storing section 410 to the state variable storing section 409 in step S813. In step S814, the output control section 408 deletes the queue from the transmission candidate.

In step S815, the output control section 408 checks whether there is any packet left in the queue. If there is a packet left in the queue, the output control section 408 checks in step S816 whether the counter value of the queue is 0 or less.

If the counter value is 0 or less, the output control section 408 adds the queue number to one of the waiting queue lists. If the counter value is 1 or more, the output control section 408 adds the queue number to one of the ready queue lists.

If it is determined in step S815 that there is no packet left in the queue, or after the processing in step S817 or S818, the output control section 408 checks in step S819 whether both the ready queue lists are empty. If at least one of the ready queue lists is not empty, the output control section 408 extracts a queue number from the start of one of the ready queue lists and stores it in one of the transmission candidates in step S820.

If both the ready queue lists are empty, the output control section 408 extracts a queue number from the start of one of the transmission candidate lists and stores it in one of the transmission candidates in step S821.

After the processing in step S820 or S821, the output control section 408 transfers the state variable of the queue newly stored in the transmission candidate from the state variable storing section 409 to the state variable temporary storing section 410 in step S822. The node apparatus 400 then terminates the packet transmitting operation.

Assume that the node apparatus 400 has transmitted a packet from one of the transmission candidates 411-1 to 411-$m$, and the queue can still transmission a packet. In this case, if both the ready queue lists 404-1 and 404-2 are empty, the node apparatus 400 can directly return the queue to the transmission candidate. In addition, if at least one of the ready queue lists 404-1 and 404-2 is not empty, the node apparatus 400 cannot directly return the queue to the transmission candidate. The node apparatus 400 therefore returns the queue to one of the ready queue lists. Along with this operation, the state variable is also returned to the state variable storing section 409.

Still another embodiment of the present invention will be described with reference to the accompanying drawings.

The arrangement and packet receiving operation of a node apparatus of this embodiment are the same as those of the apparatus in FIG. 10. These apparatuses differ only in their methods of interchanging transmission candidates in packet transmitting operation.

Figure 13:
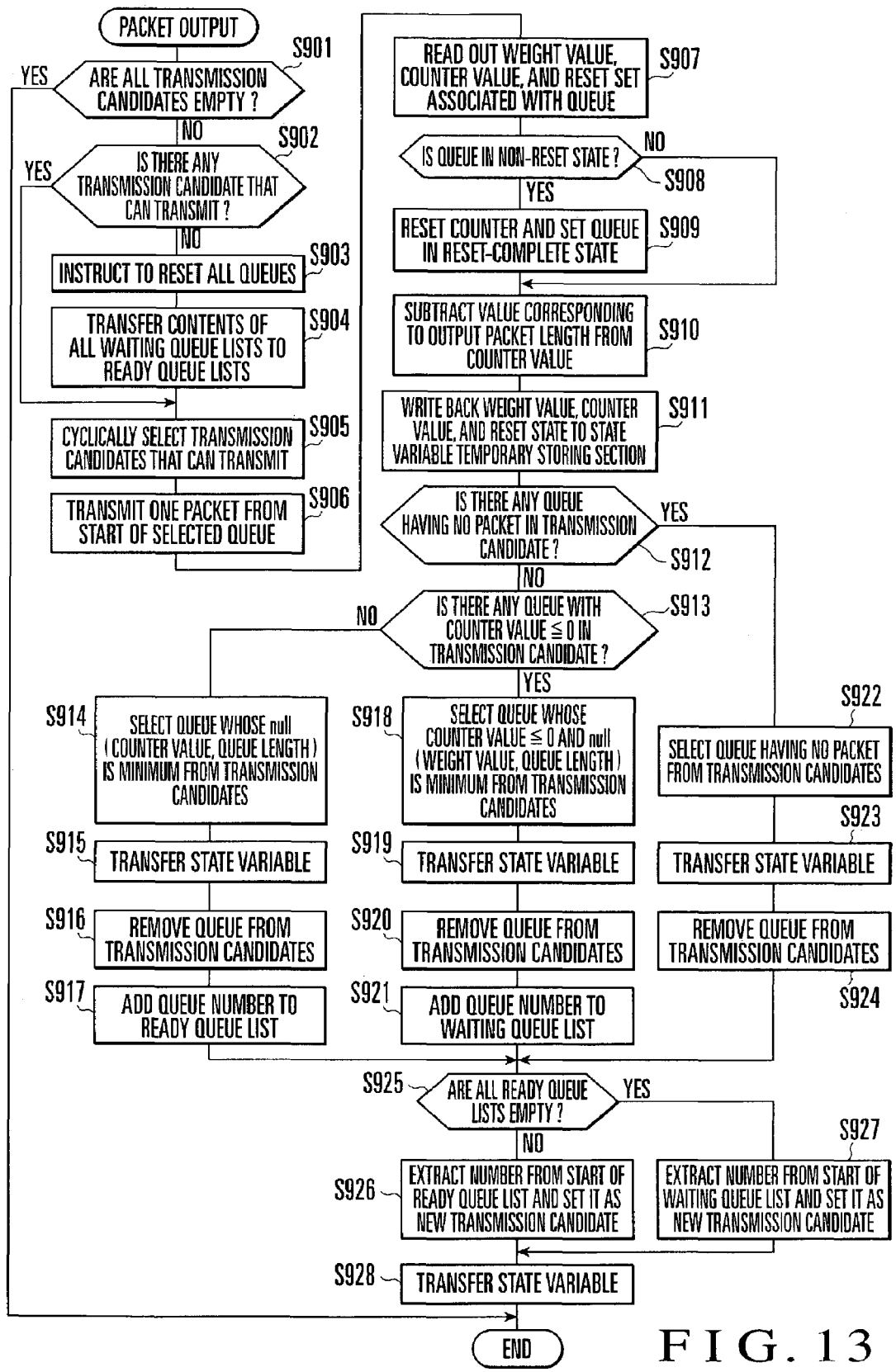
FIG. 13 is a flow chart showing another packet transmitting operation in the node apparatus in FIG. 10.
Figure 14:
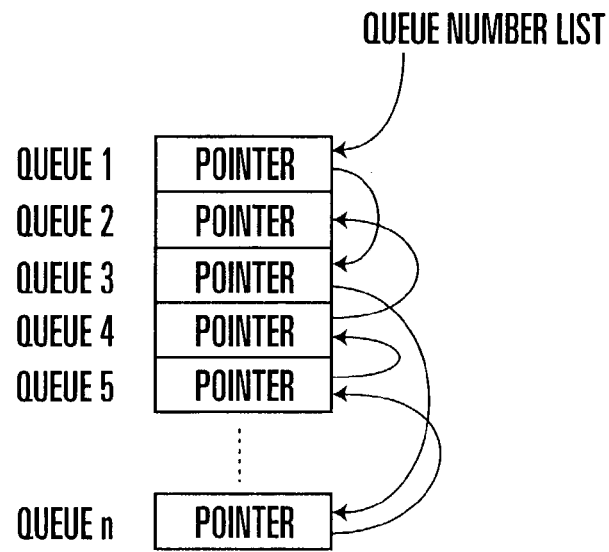
FIG. 14 is a view showing the structure of a general list in the prior art.
Figure 15:
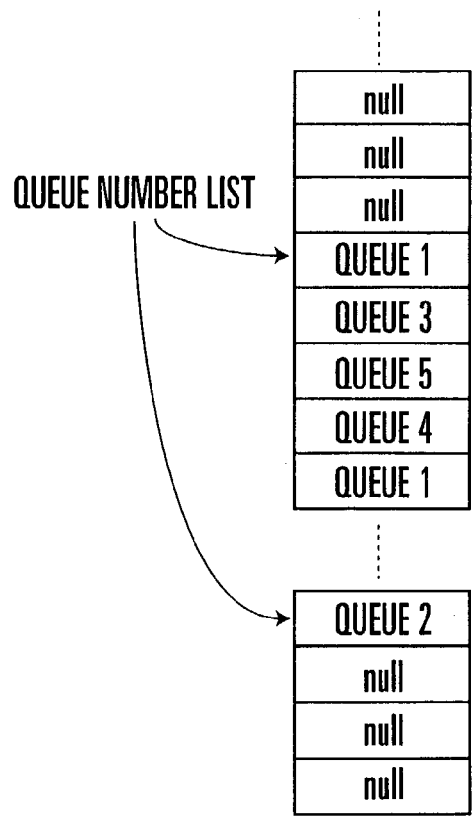
FIG. 15 is a view showing the structure of another list in the prior art.

FIG. 13 shows packet transmitting operation in the node apparatus according to this embodiment.

Referring to FIG. 13, first of all, an output control section 408 checks in step S901 whether all transmission candidates 411-1 to 411-*m* are empty. If all the transmission candidates 411-1 to 411-*m* are empty, the node apparatus 400 immediately terminates the packet transmitting operation.

If at least one of the transmission candidates 411-1 to 411-*m* is not empty, the output control section 408 checks in step S902 whether there is any ready queue in the transmission candidate.

If there is no ready queue in the transmission candidate, the output control section 408 instructs a reset control section 406 to reset all the queues in step S903. In step S904, the reset control section 406 transfers the contents of all the waiting queue lists to the corresponding ready queue lists.

If it is determined in step S902 that there is a ready queue in the transmission candidate, or after the processing in step S904, the output control section 408 instructs the packet output section 403 to cyclically select and transmit packets from the ready queue in each transmission candidate in step S905. In step S906, a packet output section 403 transmits the first packet from the queue designated by the output control section 408.

In step S907, the output control section 408 reads out, from a state variable temporary storing section 410, the counter value, weight value, and reset state of the queue for which the packet transmission instruction was given to the packet output section 403.

In step S908, the output control section 408 checks whether the queue is in a non-reset state.

If the queue is in a non-reset state, the output control section 408 resets the counter to set the reset state to a reset-complete state in step S909.

In step S910, the output control section 408 subtracts a value corresponding to the length of the packet transmitted in step S906 from the counter. In step S911, the output control section 408 returns the counter value, weight value, and reset state to the state variable temporary storing section 410.

The above processing is the same as that from step S801 to step S811 in FIG. 12.

In step S911, the output control section 408 writes back the counter value, weight value, and reset state to the state variable temporary storing section 410. In step S912, the output control section 408 checks whether the number of a queue in which no packet is stored is stored in one of the transmission candidates 411-1 to 411-*m*.

If the number of a queue in which no packet is stored is not stored in any of the transmission candidates 411-1 to 411-*m*, the output control section 408 checks in step S913 whether the number of a queue whose counter value is 0 or less is stored in one of the transmission candidates 411-1 to 411-*m*. If the number of a queue whose counter value is 0 or less is not stored in any of the transmission candidates 411-1 to 411-*m*, the output control section 408 selects a queue, from the transmission candidates, whose min (counter value, queue length) is minimum. Note that min (A, B) is a function for obtaining the minimum value from A and B.

In step S915, the output control section 408 transfers the state variable of the queue from the state variable temporary storing section 410 to the state variable storing section 409. In step S916, the output control section 408 removes the number of this queue from the transmission candidate. In step S917, the output control section 408 adds the queue number to one of ready queue lists 404-1 and 404-2.

If it is determined in step S913 that there is a transmission candidate in which the number of a queue whose counter value is 0 or less is stored, the output control section 408 selects a queue in which the counter value is 0 or less and min (weight value, queue length) is minimum from the transmission candidate.

In step S919, the output control section 408 transfers the state variable of the queue from the state variable temporary storing section 410 to state variable storing section 409. In step S420, the output control section 408 removes the queue number from the transmission candidate. In step S421, the output control section 408 adds the queue number to one of waiting queue lists 405-1 and 405-2.

If it is determined in step S912 that the number of a queue in which no packet is stored is stored in one of the transmission candidates 411-1 to 411-*m*, the output control section 408 selects the queue from the transmission candidate in step S922. In step S923, the output control section 408 transfers the state variable of the queue from the state variable temporary storing section 410 to the state variable storing section 409. In step S924, the output control section 408 removes the queue from the transmission candidate.

After the processing in step S917, S921, or S924, the output control section 408 checks in step S925 whether both the ready queue lists 404-1 and 404-2 are empty.

If at least one of the ready queue lists 404-1 and 404-2 is not empty, the output control section 408 extracts a queue number from the start of one of the ready queue lists and stores it in a transmission candidate in step S925. In step S926, the output control section 408 transfers the state variable of the queue having the number newly stored in the transmission candidate from the state variable storing section 409 to the state variable temporary storing section 410. The node apparatus 400 then terminates the packet transmitting operation.

If it is determined in step S925 that both the ready queue lists 404-1 and 404-2 are empty, the output control section 408 extracts a queue number from the start of one of the ready queue lists and stores it in the transmission candidate in step S927. The flow then advances to step S928.

As has been described above, the node apparatus according to the present invention prefetches the state variables of queues near the start of a list means from the state variable storing means to the state variable temporary storing means smaller in data amount than the state variable storing section. In transmitting packets, therefore, processing associated with state variables can be done at high speed. This node apparatus can therefore be applied to an ultrafast line.

In addition, the node apparatus according to the present invention always prefetches the state variables of queues from the state variable storing means to the state variable temporary storing means. In transmitting packets, therefore, processing associated with state variables can be done at high speed. This node apparatus can therefore be applied to an ultrafast line.

Furthermore, in the node apparatus according to the present invention, a list means is separated into a plurality of lists. Therefore, even in a structure in which the data of each list are concatenated by pointers, queue numbers can be read out at shorter intervals than the read intervals of pointers. Hence, this node apparatus can be applied to an ultrafast line.

What is claimed is:

1. A node apparatus which stores a received packet in one of a plurality of queues, determines on the basis of a state variable of each of the queues whether each of the plurality of queues is in a ready state for packet transmission, and transmits the packet from the queue in a ready state for packet transmission, the node apparatus comprising:
list means in which numbers identifying which of the plurality of queues in a ready state for packet transmission are written and which manages an order in which the numbers were written;
state variable storing means for holding state variables associated with all of the plurality of queues;
state variable temporary storing means which temporarily stores only state variables associated with queues having identifying numbers within a predetermined range from a start of said list means and is smaller in data amount than said state variable storing means; and
control means for transmitting a packet from a queue having a number extracted from the start of said list means and updating a state variable of the queue in said state variable temporary storing means,
wherein
said control means adds the number of the queue to said list means if it is determined on the basis of the state variable updated when the packet was transmitted from the queue extracted from the start of said list means that the queue is still in a ready state for packet transmission, and
said state variable temporary storing means, when said control means extracts a number from said list means, newly stores a state variable associated with a queue falling in the predetermined range from the start of said list means, and when a queue number is added to said list means, stores a state variable associated with the queue if the number of numbers in said list means falls within the predetermined range.

2. An apparatus according to claim 1, wherein
the packet is stored in one of the queues in accordance with an attribute of the packet, and
the state variable includes the number of packets that can be transmitted from the queue and calculated from a weight or band assigned to each queue in association with the attribute, and packets transmitted from the queue, or the amount of data that can be transmitted as packets from the queue.

3. An apparatus according to claim 2, wherein when the queue stores at least one packet and transmission of the packet is permitted in accordance with the state variable, the queue is in a ready state for packet transmission.

4. An apparatus according to claim 1, wherein said list means comprises a plurality of lists.

5. An apparatus according to claim 4, wherein a plurality of lists in said list means are cyclically selected.

6. An apparatus according to claim 4, wherein when numbers of a plurality of lists in said list means are written, a list in which a small number of queues are stored is selected, and when a number is extracted, a list in which a large number of queues are stored is selected.

7. An apparatus according to claim 1, wherein
said apparatus further comprises calendar means in which a number of a queue is recorded for each transmission time of a packet which is determined from a band assigned to the queue, and
said control means transfers a number of a queue which is determined by said calendar means to transmit a packet at the current time from said calendar means to said list means.

8. A node apparatus which stores a received packet in one of a plurality of queues, determines on the basis of a state variable of each of the queues whether each of the plurality of queues is in a ready state for packet transmission, and transmits the packet from the queue in a ready state for packet transmission, the node apparatus comprising:
list means in which numbers identifying which of the plurality of queues in a ready state for packet transmission are written and which manages an order in which the numbers were written;
state variable storing means for holding state variables associated with all of the plurality of queues;
state variable temporary storing means which temporarily stores state variables associated with not more than a predetermined number of queues and is smaller in data amount than said state variable storing means;
at least one transmission candidate means for holding a number of each queue whose state variable is held in said state variable temporary storing section in place of said list means; and
control means for transmitting a packet from a queue, of queues whose numbers are held by said transmission candidate means, which can transmit a packet, and updating a state variable of the queue in said state variable temporary storing means,
wherein
said state variable temporary storing means newly stores a state variable associated with a queue having a number at a start of said list means when a free space is produced in said state variable temporary storing means, and when there is a new queue set in a ready state for packet transmission and there is a free space in said state variable temporary storing means, stores a state variable associated with the queue, and
when it is determined on the basis of a state variable updated upon transmission of a packet from any one of the queues that the queue is still in a ready state for packet transmission, said control means returns the state variable to said state variable temporary storing means if said list means is empty, and returns the state variable to said state variable storing means if said list means is not empty.

9. An apparatus according to claim 8, wherein
the packet is stored in one of the queues in accordance with an attribute of the packet, and
the state variable includes the number of packets that can be transmitted from the queue and calculated from a weight or band assigned to each queue in association with the attribute, and packets transmitted from the queue, or the amount of data that can be transmitted as packets from the queue.

10. An apparatus according to claim 9, wherein when the queue stores at least one packet and transmission of the packet is permitted in accordance with the state variable, the queue is in a ready state for packet transmission.

11. An apparatus according to claim 8, wherein said list means comprises a plurality of lists.

12. An apparatus according to claim 11, wherein a plurality of lists in said list means are cyclically selected.

13. An apparatus according to claim 11, wherein when numbers of a plurality of lists in said list means are written, a list in which a small number of queues are stored is selected, and when a number is extracted, a list in which a large number of queues are stored is selected.

14. An apparatus according to claim 8, wherein
said apparatus further comprises calendar means in which a number of a queue is recorded for each transmission time of a packet which is determined from a band assigned to the queue, and
said control means transfers a number of a queue which is determined by said calendar means to transmit a packet at the current time from said calendar means to said list means.

15. A node apparatus which stores a received packet in one of a plurality of queues, determines on the basis of a state variable of each of the queues whether each of the plurality of queues is in a ready state for packet transmission, and transmits the packet from the queue in a ready state for packet transmission, the node apparatus comprising:
first list means in which numbers identifying which of the plurality of queues in a ready state for packet transmission are written and which manages an order in which the numbers were written;
second list means in which numbers identifying which of the plurality of queues in a wait state for packet transmission are written and which manages an order in which the numbers were written;
state variable storing means for holding state variables associated with all queues;
state variable temporary storing means which temporarily stores only state variables associated with queues having identifying numbers within a predetermined range from a start of said first list means, when there is no queue number, in said first list, which falls within the predetermined range, extracts and temporarily stores a queue number corresponding to the shortage from a start of said second list means, and is smaller in data amount than said state variable storing means; and
control means (108) for transmitting a packet from a queue having a number extracted from the start of said list means and updating a state variable of the queue in said state variable temporary storing means,
wherein
said control means adds the number of the queue to said first list means if it is determined on the basis of the state variable updated when the packet was transmitted from the queue extracted from the start of said first list means that the queue is still in a ready state for packet transmission, and adds the number of the queue to said second list means if the queue is in a wait state for packet transmission, and
said state variable temporary storing means, when said control means extracts a number from said first list means, newly stores a state variable associated with a queue falling in the predetermined range from the start of said first list means, and when a queue number is added to said first list means, stores a state variable associated with the queue if the number of numbers in said first list means falls within the predetermined range, and stores the state variable associated with the queue when the queue number is added to said second list means and a sum of the number of numbers in said first list means and the number of numbers in said second list means falls within the predetermined range.

16. An apparatus according to claim 15, wherein
the packet is stored in one of the queues in accordance with an attribute of the packet, and
the state variable includes the number of packets that can be transmitted from the queue and calculated from a weight or band assigned to each queue in association with the attribute, and packets transmitted from the queue, or the amount of data that can be transmitted as packets from the queue.

17. An apparatus according to claim 16, wherein when the queue stores at least one packet and transmission of the packet is permitted in accordance with the state variable, the queue is in a ready state for packet transmission.

18. An apparatus according to claim 16, wherein when the queue stores at least one packet and it is determined from the state variable that a packet cannot be transmitted, the queue is set in a wait state of transmission.

19. An apparatus according to claim 15, wherein said each of first and second list means comprises a plurality of lists.

20. An apparatus according to claim 19, wherein a plurality of lists in said first and second list means are cyclically selected.

21. An apparatus according to claim 20, wherein when numbers of a plurality of lists in said first and second list means are written, a list in which a small number of queues are stored is selected, and when a number is extracted, a list in which a large number of queues are stored is selected.

22. A node apparatus which stores a received packet in one of a plurality of queues, determines on the basis of a state variable of each of the queues whether each of the plurality of queues is in a ready state for packet transmission, and transmits the packet from the queue in a ready state for packet transmission, the node apparatus comprising:
first list means in which numbers identifying which of the plurality of queues in a ready state for packet transmission are written and which manages an order in which the numbers were written;
second list means in which numbers identifying which of the plurality of queues in a wait state for packet transmission are written and which manages an order in which the numbers were written;
state variable storing means for holding state variables associated with all of the plurality of queues;
state variable temporary storing means which temporarily stores state variables associated with not less than a predetermined number of queues and is smaller in data amount than said state variable storing means;
at least one transmission candidate means for holding a number of each queue whose state variable is stored in said state variable temporary storing means in place of said first or second list means; and
control means (408) for transmitting a packet from a queue, of the queues whose numbers are held in said transmission candidate means, which can transmit a packet, and updating the state variable of the queue in said state variable temporary storing means,
wherein
said state variable temporary storing means newly stores a state variable associated with a queue having a number at a start of said first list means when a free space is produced in said state variable temporary storing means, newly stores a state variable associated with a queue having a number at a start of said second list means when said first list means is empty, and when there is a new queue set in a ready state for packet transmission or in a wait state for packet transmission and there is a free space in said state variable temporary storing means, newly stores a state variable associated with the queue, and when it is determined on the basis of a state variable undated upon transmission of a packet from any one of the queues that the queue is in a ready state for packet transmission and said first list means is empty, said control means returns the state variable to said state variable temporary storing means, when said first list means is not empty, said control means returns the state variable to said state variable storing means, when it is determined on the basis of a state variable updated upon transmission of a packet from any one of the queues that the queue is in a wait state for packet transmission and said first and second list means are empty, said control means returns the state variable to said state variable temporary storing means, and when said first or second list means is not empty, said control means returns the state variable to said state variable storing means.

23. An apparatus according to claim 22, wherein the packet is stored in one of the queues in accordance with an attribute of the packet, and the state variable includes the number of packets that can be transmitted from the queue and calculated from a weight or band assigned to each queue in association with the attribute, and packets transmitted from the queue, or the amount of data that can be transmitted as packets from the queue.

24. An apparatus according to claim 23, wherein when the queue stores at least one packet and transmission of the packet is permitted in accordance with the state variable, the queue is in a ready state for packet transmission.

25. An apparatus according to claim 23, wherein when the queue stores at least one packet and it is determined from the state variable that a packet cannot be transmitted, the queue is set in a wait state of transmission.

26. An apparatus according to claim 22, wherein said each of first and second list means comprises a plurality of lists.

27. An apparatus according to claim 26, wherein a plurality of lists in said first and second list means are cyclically selected.

28. An apparatus according to claim 27, wherein when numbers of a plurality of lists in said first and second list means are written, a list in which a small number of queues are stored is selected, and when a number is extracted, a list in which a large number of queues are stored is selected.

29. A method of storing a received packet in one of a plurality of queues, determining on the basis of a state variable of each of the plurality of queues whether each of the queues is in a ready state for packet transmission, and transmitting the packet from the queue in a ready state for packet transmission, characterized by comprising:

the first step of writing numbers identifying which of the plurality of queues in a ready state for packet transmission in a list and managing an order in which the numbers were written;

the second step of holding state variables associated with all of the plurality of queues;

the third step of temporarily storing only state variables associated with queues having identifying numbers within a predetermined range from a start of the list; and the fourth step of transmitting a packet from a queue having a number extracted from the start of the list and updating a state variable of the queue in the third steps, wherein the number of the queue is added to said list in the fourth step if it is determined on the basis of the state variable updated when the packet was transmitted from the queue extracted from the start of said list that the queue is still in a ready state for packet transmission, and a state variable associated with a queue falling in the predetermined range from the start of said list is newly stored in the third step, and when a queue number is added to said list, a state variable associated with the queue is stored if the number of numbers in said list falls within the predetermined range.

30. A method of storing a received packet in one of a plurality of queues, determining on the basis of a state variable of each of the queues whether each of the plurality of queues is in a ready state for packet transmission, and transmitting the packet from the queue in a ready state for packet transmission, the method comprising:

the first step of writing numbers identifying which of the plurality of queues in a ready state for packet transmission in a list and managing an order in which the numbers were written;

the second step of holding state variables associated with all of the plurality of queues;

the third step of temporarily storing state variables associated with not more than a predetermined number of queues;

the fourth step of holding, as a transmission candidate, a number of each queue whose state variable is held in the third step; and the fifth step of transmitting a packet from a queue, of the queues whose numbers are held as the transmission candidates, which can transmit a packet, and updating a state variable of the queue held in the third step, wherein a state variable associated with a queue having a number at a start of said list is newly stored in the third step when a free space is determined to exist in the third step, and when there is a new queue set in a ready state for packet transmission and there is a free space in the third step, a state variable associated with the queue is stored, and when it is determined on the basis of a state variable updated upon transmission of a packet from any one of the queues that the queue is still in a ready state for packet transmission, the state variable is returned to be temporarily stored in the third step if said list is empty, and the state variable is returned to be held in the second step if said list is not empty.

31. A method of storing a received packet in one of a plurality of queues, determining on the basis of a state variable of each of the queues whether each of the plurality of queues is in a ready state for packet transmission, and transmitting the packet from the queue in a ready state for packet transmission, the method comprising:

the first step of writing numbers identifying which of the plurality of queues in a ready state for packet transmission in a first list and managing an order in which the numbers were written;

the second step of writing numbers identifying which of the plurality of queues in a wait state for packet transmission in a second list and managing an order in which the numbers were written;

the third step of holding state variables associated with all of the plurality of queues;

the fourth step of temporarily storing state variables associated with queues whose numbers fall within a predetermined range from a start of the first list, when there is no queue number, in the first list, which falls within the predetermined range, extracting a queue number corresponding to the shortage from a start of the second list, and temporarily storing the queue number; and the fifth step of transmitting a packet from a queue having a number extracted from the start of the list and updating a state variable of the queue in the state variable temporary storing means, wherein the number of the queue is added to said first list in the fifth step if it is determined on the basis of the state variable updated when the packet was transmitted from the queue extracted from the start of said first list that the queue is still in a ready state for packet transmission, and the number of the queue is added to said second list if the queue is in a wait state for packet transmission, and when said control means extracts a number from said first list means, a state variable associated with a queue falling in the predetermined range from the start of said first list means is newly stored, and when a queue number is added to said first list, a state variable associated with the queue is stored if the number of numbers in said first list falls within the predetermined range, and the state variable associated with the queue is stored when the queue number is added to said second list and a sum of the number of numbers in said first list and the number of numbers in said second list falls within the predetermined range.

32. A method of storing a received packet in one of a plurality of queues, determining on the basis of a state variable of each of the queues whether each of the plurality of queues is in a ready state for packet transmission, and transmitting the packet from the queue in a ready state for packet transmission, the method comprising:

the first step of writing numbers identifying which of the plurality of queues in a ready state for packet transmission in a first list and managing an order in which the numbers were written;

the second step of writing numbers identifying which of the plurality of queues in a wait state for packet transmission in a second list and managing an order in which the numbers were written;

the third step of holding state variables associated with all of the plurality of queues;

the fourth step of temporarily storing state variables associated with not less than a predetermined number of queues;

the fifth step (S710, 5711, 411-1-411-n) of holding, as a transmission candidate, a number of each queue whose state variable is stored in the fourth step in place of the first or second list; and the sixth step (S8001-S822, 408) of transmitting a packet from a queue, of the queues whose numbers are held as the transmission candidates, which can transmit a packet, and updating the state variable of the queue held in the fourth step, wherein a state variable associated with a queue having a number at a start of said first list is newly stored when a free space is produced for storing in the fourth step, a state variable associated with a queue having a number at a start of said second list is newly stored when said first list is empty, and when there is a new queue set in a ready state for packet transmission or in a wait state for packet transmission and there is a free space for storing in the fourth step, a state variable associated with the queue is newly stored, and when it is determined on the basis of a state variable updated upon transmission of a packet from any one of the queues that the queue is in a ready state for packet transmission and said first list is empty, the state variable is returned to be stored in the fourth step, when said first list is not empty, the state variable is returned to be stored in the third step, when it is determined on the basis of a state variable updated upon transmission of a packet from any one of the queues that the queue is in a wait state for packet transmission and said first and second list are empty, the state variable is returned to be stored in the fourth step, and when said first or second list is not empty, the state variable is returned to be stored in the fourth step.

* * * * *